(12) United States Patent
Briceno et al.

(10) Patent No.: US 9,650,080 B2
(45) Date of Patent: May 16, 2017

(54) VEHICLES HAVING A CROSS-VEHICLE STABILIZING STRUCTURE

(71) Applicant: Toyota Motor Engineering & Manufacturing North America, Inc., Erlanger, KY (US)

(72) Inventors: Carlos M. Briceno, Ypsilanti, MI (US); Maurice P. Silva, Gaithersburg, MD (US); Jonathan R. Young, Saline, MI (US); Adam D. Holmstrom, Pinckney, MI (US); Naipaul D. Ramoutar, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 15/004,173

(22) Filed: Jan. 22, 2016

(65) Prior Publication Data

US 2016/0137231 A1    May 19, 2016

Related U.S. Application Data

(62) Division of application No. 14/514,782, filed on Oct. 15, 2014, now Pat. No. 9,381,949.

(51) Int. Cl.
*B60J 7/00* (2006.01)
*B62D 25/08* (2006.01)

(52) U.S. Cl.
CPC ......... *B62D 25/082* (2013.01); *B62D 25/088* (2013.01)

(58) Field of Classification Search
CPC .......... B60G 21/0555; B60G 2202/135; B60G 17/0162; B60G 2202/42; B60G 2204/1222; B60P 3/08; G07B 15/063; B62D 1/28; G01S 13/9331; G01C 21/28
USPC ..... 296/187.1; 280/124.1, 124.106, 124.107, 280/124.109, 124.152, 5.511
See application file for complete search history.

(56) References Cited

U.S. PATENT DOCUMENTS

| | | |
|---|---|---|
| 3,086,606 A | 4/1963 | Schwiering |
| 3,188,132 A | 6/1965 | Schwiering |
| 3,211,491 A * | 10/1965 | Browne ............... B62D 25/082 267/292 |
| 3,596,978 A | 8/1971 | Wessells, Iii et al. |

(Continued)

FOREIGN PATENT DOCUMENTS

JP    2009269488    11/2009

*Primary Examiner* — Kiran B Patel
(74) *Attorney, Agent, or Firm* — Dinsmore & Shohl LLP

(57) ABSTRACT

Vehicle structures for dissipating energy associated with a collision are described herein. In one embodiment, a vehicle includes a first side support extending in a vehicle longitudinal direction, a second side support extending in the vehicle longitudinal direction and spaced apart from the first side support in a vehicle lateral direction that is transverse to the vehicle longitudinal direction, and a cross-vehicle stabilizing structure extending between the first side support and the second side support, the cross-vehicle stabilizing structure including a first joint portion coupled to the first side support, the first joint portion including a stiffness-reducing portion positioned within a perimeter of the first joint portion, a second joint portion coupled to the second side support, and a cross-vehicle stabilizer portion coupled to the first joint portion and the second joint portion.

19 Claims, 9 Drawing Sheets

(56) References Cited

U.S. PATENT DOCUMENTS

| | | | |
|---|---|---|---|
| 4,440,435 A * | 4/1984 | Norlin | B62D 25/082 280/784 |
| 5,382,034 A | 1/1995 | Parker et al. | |
| 5,411,311 A | 5/1995 | Shimmell et al. | |
| 5,732,969 A * | 3/1998 | Spoto | B60G 21/05 267/183 |
| 6,099,004 A | 8/2000 | Lin | |
| 6,523,878 B2 * | 2/2003 | Scheidel | B62D 25/145 180/90 |
| 6,860,547 B2 * | 3/2005 | Winter | B62D 25/08 180/90 |
| 7,097,235 B2 * | 8/2006 | Yasukouchi | B62D 21/152 296/187.03 |
| 7,219,954 B2 * | 5/2007 | Gomi | B62D 25/082 296/187.09 |
| 7,404,596 B2 * | 7/2008 | Miyata | B62D 25/088 296/203.02 |
| 7,513,515 B1 | 4/2009 | Ortiz | |
| 7,850,228 B2 * | 12/2010 | Asai | B62D 21/152 180/299 |
| 7,854,473 B2 * | 12/2010 | Kuroita | B62D 25/081 296/192 |
| 7,883,113 B2 * | 2/2011 | Yatsuda | B62D 21/11 180/232 |
| 8,002,334 B2 * | 8/2011 | Bechtold | B62D 25/081 296/192 |
| 8,128,160 B2 * | 3/2012 | Leanza | B62D 25/082 296/187.09 |
| 8,205,925 B2 * | 6/2012 | Hattori | B62D 25/088 296/187.09 |
| 8,398,156 B2 | 3/2013 | Matsuoka | |
| 8,585,066 B2 * | 11/2013 | Young | B62D 21/155 280/124.109 |
| 8,596,711 B2 * | 12/2013 | Yasui | B60R 19/34 296/187.09 |
| 8,702,158 B2 * | 4/2014 | Kihara | B62D 25/082 296/203.02 |
| 8,708,403 B2 * | 4/2014 | Herntier | B62D 25/08 280/781 |
| 8,733,825 B2 | 5/2014 | Kim et al. | |
| 8,801,080 B2 * | 8/2014 | Uhlenbruch | B62D 21/155 296/187.09 |
| 8,857,902 B2 | 10/2014 | Sekiguchi et al. | |
| D727,802 S | 4/2015 | Sung et al. | |
| 9,033,400 B2 | 5/2015 | Sasaki et al. | |
| 9,067,627 B2 * | 6/2015 | Hara | B62D 21/152 |
| 9,096,276 B2 * | 8/2015 | Komiya | B62D 21/11 |
| 9,126,550 B2 * | 9/2015 | Nusier | B62D 21/152 |
| 2001/0033094 A1 * | 10/2001 | Sano | B62D 21/152 296/203.02 |
| 2005/0067858 A1 | 3/2005 | Suh et al. | |
| 2006/0027993 A1 | 2/2006 | Takayanagi et al. | |
| 2007/0215402 A1 | 9/2007 | Sasaki et al. | |
| 2007/0246971 A1 * | 10/2007 | Hanakawa | B62D 25/081 296/203.01 |
| 2008/0252103 A1 | 10/2008 | Bechtold et al. | |
| 2012/0056446 A1 | 3/2012 | Stojkovic et al. | |
| 2013/0099460 A1 * | 4/2013 | Tanaka | B60G 3/20 280/124.107 |
| 2013/0113176 A1 * | 5/2013 | Eguchi | B60G 3/20 280/124.107 |
| 2013/0249245 A1 | 9/2013 | Sekiguchi et al. | |
| 2013/0270030 A1 | 10/2013 | Young et al. | |
| 2014/0035249 A1 * | 2/2014 | Teijeiro Castro | B60G 21/005 280/124.106 |
| 2014/0084634 A1 | 3/2014 | Suzuki et al. | |
| 2014/0319880 A1 | 10/2014 | Shigihara | |
| 2015/0166113 A1 * | 6/2015 | Hong | B62D 25/08 296/187.1 |

* cited by examiner

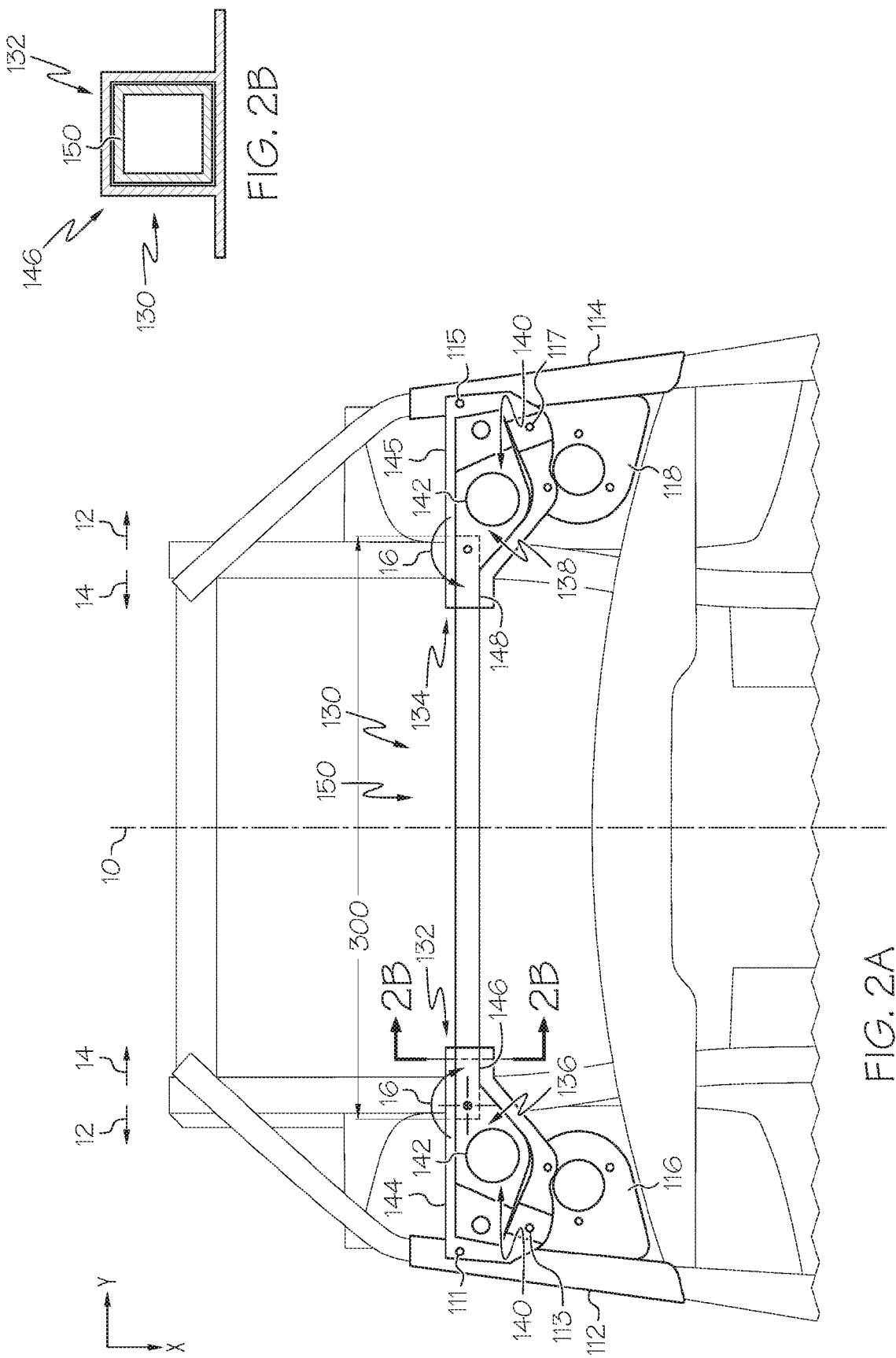

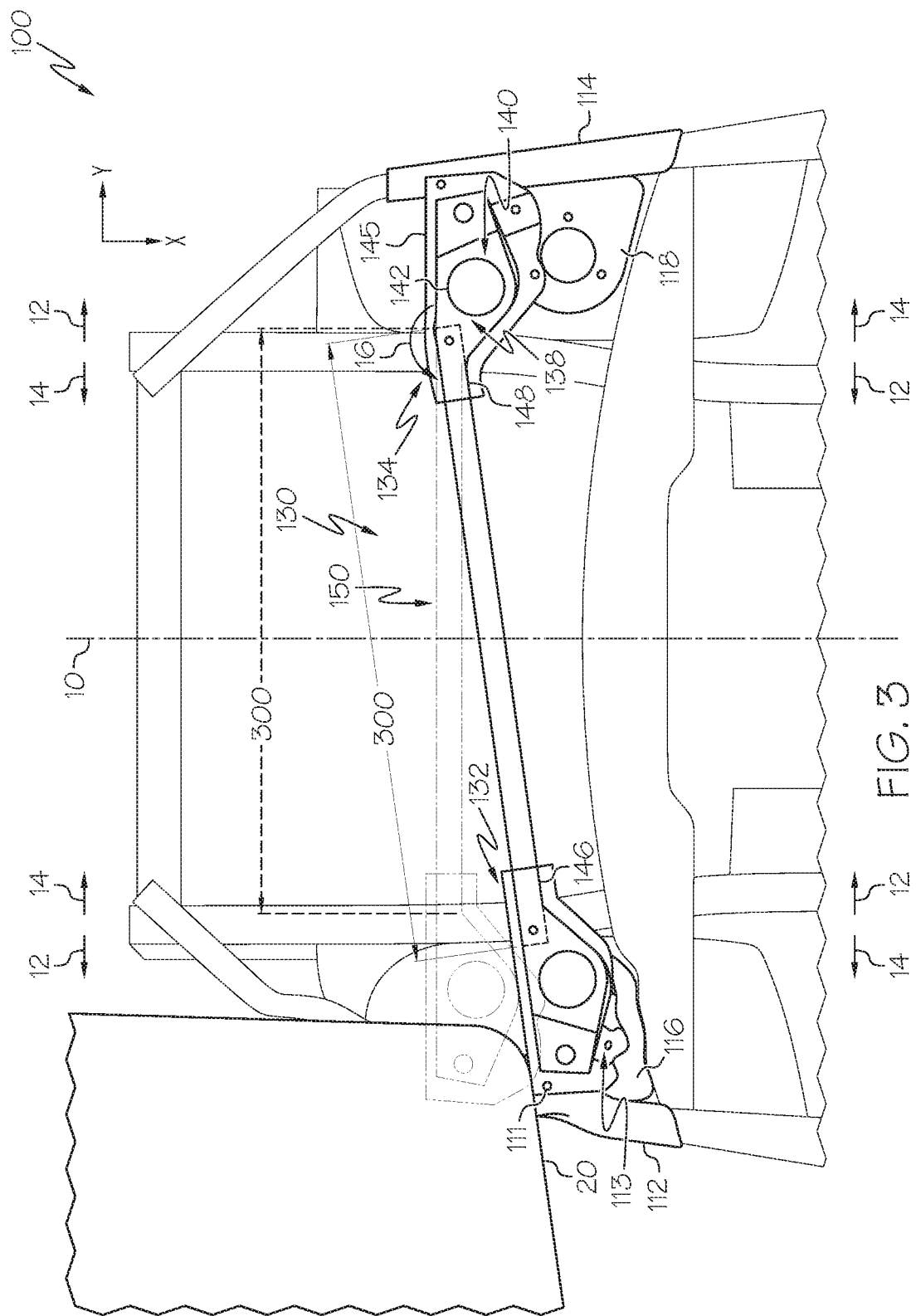

VEHICLES HAVING A CROSS-VEHICLE STABILIZING STRUCTURE

CROSS-REFERENCE TO RELATED APPLICATIONS

The present application is a divisional of U.S. Non-Provisional patent application Ser. No. 14/514,782, filed on Oct. 15, 2014 and entitled "Vehicles Having a Cross-Vehicle Stabilizing Structure," the entire disclosure of which is hereby incorporated by reference.

TECHNICAL FIELD

The present specification generally relates to vehicles including structures for transferring and absorbing energy in the event of an impact and, more specifically, to vehicles that include a cross-vehicle stabilizing structure.

BACKGROUND

Vehicles may be equipped with bumper systems and crash protection structures that plastically deform to absorb energy in the event of a crash. When a vehicle impacts or is impacted by an object that is offset from the centerline of the vehicle such that the object overlaps a portion of the bumper, the ability of the energy absorbing structures of the vehicle to absorb energy associated with the impact may be reduced. In some impact configurations, the energy absorbing structures of the vehicle may not be activated or may be only partially activated because the object does not come into contact or only partially comes into contact with associated bumper or vehicle structures. Therefore, the bumper and the energy absorbing structures of the vehicle may have a reduced effect on the dissipation of the energy of the impact. Instead, the energy from the impact may be directed into various vehicle structures, including the front side supports of the vehicle.

In one example, a substantial portion of energy from an impact with a small front bumper overlap may be directed into a front side support. As energy is directed into the front side support, the front side support may tend to rotate toward an interior of an engine bay of the vehicle, deflecting away from the direction of the impact of the collision. When the front side support deflects away from the impact of the collision, the front side support absorbs less energy than when the side support does not deflect away from the impact of the collision.

Accordingly, a need exists for alternative structures for transferring energy and absorbing energy from a small front bumper overlap collision.

SUMMARY

In one embodiment, a vehicle includes a first side support extending in a vehicle longitudinal direction, a second side support extending in the vehicle longitudinal direction and spaced apart from the first side support in a vehicle lateral direction that is transverse to the vehicle longitudinal direction, and a cross-vehicle stabilizing structure extending between the first side support and the second side support, the cross-vehicle stabilizing structure including a first joint portion coupled to the first side support, the first joint portion including a stiffness-reducing portion positioned within a perimeter of the first joint portion, a second joint portion coupled to the second side support, and a cross-vehicle stabilizer portion coupled to the first joint portion and the second joint portion.

In another embodiment, a vehicle includes a first side support extending in a vehicle longitudinal direction, a second side support extending in the vehicle longitudinal direction and spaced apart from the first side support in a vehicle lateral direction that is transverse to the vehicle longitudinal direction, a first front suspension mount coupled to the first side support, and a cross-vehicle stabilizing structure extending between the first side support and the second side support, the cross-vehicle stabilizing structure including a first joint portion coupled to the first side support, the first joint portion including a stiffness-reducing portion positioned within a perimeter of the first joint portion, where the first joint portion has a buckling strength evaluated in the vehicle longitudinal direction that is less than a buckling strength of the first front suspension mount evaluated in the vehicle longitudinal direction, a second joint portion coupled to the second side support, and a cross-vehicle stabilizer portion coupled to the first joint portion and the second joint portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2A schematically depicts a top view of a cross-vehicle stabilizing structure according to one or more embodiments shown or described herein;

FIG. 2B schematically depicts an enlarged sectional view of a cross-vehicle stabilizing structure along section 2B-2B depicted in FIG. 2A according to one or more embodiments shown or described herein;

FIG. 3 schematically depicts a top view of a cross-vehicle stabilizing structure and a side support under deformation according to one or more embodiments shown or described herein;

DETAILED DESCRIPTION

Vehicle structures for directing and dissipating energy in the event of a small front bumper overlap collision, in which only a portion of the energy dissipation structures of the vehicle are activated, are disclosed herein. A vehicle according to the present disclosure may include a first side support and a second side support that extend in a vehicle longitudinal direction. The second side support is spaced apart from the first side support in a vehicle lateral direction that is transverse to the vehicle longitudinal direction. The vehicle further includes a cross-vehicle stabilizing structure extending between the first side support and the second side support. The cross-vehicle stabilizing structure may provide selective stiffening in the vehicle lateral direction so that energy absorbing structures of the vehicle may be maintained in a position to dissipate energy associated with an impact. By maintaining the energy absorbing structures of the vehicle in a position to dissipate energy, the cross-vehicle stabilizing structure may increase an overall stiffness of the vehicle in the vehicle longitudinal direction. Various embodiments of vehicles including cross-vehicle stabilizing structures are described in detail below.

Motor vehicles may include a variety of construction methodologies that are conventionally known, including a unibody construction methodology, the resulting structure of which is depicted in FIGS. 1-9, as well as a body-on-frame construction methodology. As discussed hereinabove, a unibody construction includes a plurality of structural members that jointly defines the passenger cabin of the vehicle and provides the structural mounts for vehicle drivetrain and the suspension. In contrast, body-on-frame construction includes a cabin that generally supports the body panels of the vehicle and that defines the passenger cabin of the vehicle. In a body-on-frame construction, the cabin is attached to a frame that provides structural support to the drivetrain and suspension of the vehicle. While the embodiments of the present disclosure are described and depicted herein in reference to unibody structures, it should be understood that vehicles that are constructed with body-on-frame construction may incorporate the elements that are shown and described herein.

Figure 1:
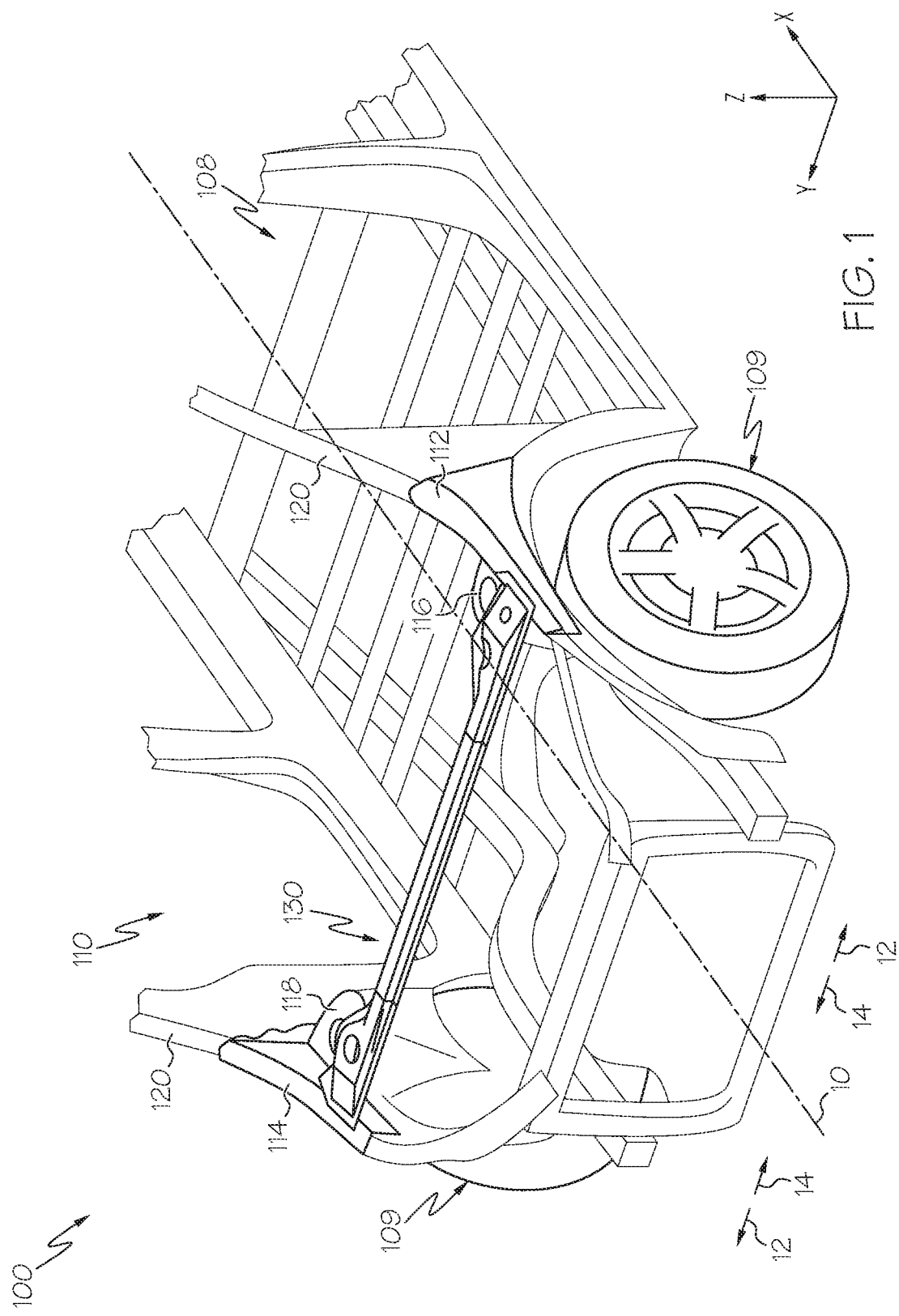
FIG. 1 schematically depicts a perspective view of a front portion of a vehicle including a cross-vehicle stabilizing structure according to one or more embodiments shown or described herein.

Referring to FIG. 1, a unibody 110 defines a cabin 108. The unibody 110 includes a first side support 112 and a second side support 114 that extend in a vehicle longitudinal direction (i.e., in the +/−vehicle X-direction depicted in FIG. 1). The first side support 112 and the second side support 114 are spaced apart from one another in the vehicle in a vehicle lateral direction (i.e., in the +/−vehicle Y-direction depicted in FIG. 1), where the vehicle lateral direction is transverse to the vehicle longitudinal direction. An A-pillar 120 extends rearward in the vehicle longitudinal direction (i.e., in the +vehicle X direction depicted in FIG. 1) and upward (i.e., in the +vehicle Z-direction depicted in FIG. 1) from the first side support 112 and the second side support 114. The A-pillar 120 may extend upward to support a roof (not shown) of the vehicle 100 as conventionally known. A first front suspension mount 116 is coupled to the first side support 112 and a second front suspension mount 118 is coupled to the second side support 114. The first front suspension mount 116 and the second front suspension mount 118 may couple front suspension units 109 to the unibody 110. The front suspension units 109 may generally include components that connect the unibody 110 to a tire. The A-pillar 120 and the first and second front suspension mounts 116, 118 may be coupled to the first and second side supports 112, 114 through a variety of joining techniques including, for example and without limitation, mechanical fasteners, spot welds, weld joints, structural adhesives, brazes, shear pins, and the like. Alternatively, the A-pillar 120 and the first and second front suspension mounts 116, 118 may be integrally formed with the first and second side supports 112, 114.

As used herein, the term "vehicle longitudinal direction" refers to the forward-rearward direction of the vehicle (i.e., in the +/−vehicle X-direction depicted in FIG. 1). The term "vehicle lateral direction" refers to the cross-vehicle direction of the vehicle (i.e., in the +/−vehicle Y-direction depicted in FIG. 1), and is transverse to the vehicle longitudinal direction. Further, the terms "inboard" and "outboard" are used to describe the relative positioning of various components of the vehicle. The term "outboard" as used herein refers to the relative location of a component in direction 12 with respect to a vehicle centerline 10. The term "inboard" as used herein refers to the relative location of a component in direction 14 with respect to the vehicle centerline 10. Because the vehicle structure of the vehicle 100 may be generally symmetrical about the vehicle centerline 10, the use of terms "inboard" and "outboard" may be switched when evaluating components positioned along opposite sides of the vehicle 100.

Referring to FIGS. 1 and 2A-2B, the vehicle 100 includes a cross-vehicle stabilizing structure 130. The cross-vehicle stabilizing structure 130 extends between the first side support 112 and the second side support 114 of the unibody 110. Referring to FIG. 2A, the cross-vehicle stabilizing structure 130 may include a first joint portion 132 that is coupled to the first side support 112. The cross-vehicle stabilizing structure 130 may also include a second joint portion 134 that is coupled to the second side support 114. The first joint portion 132 may be coupled to the first front suspension mount 116. Similarly, the second joint portion 134 may be coupled to the second front suspension mount 118. In embodiments, at least a portion of the first joint portion 132 may be positioned forward of the first front suspension mount 116.

The first joint portion 132 may be coupled to the first side support 112 at a first side support securement location 111. The first joint portion 132 may also be coupled to the first front suspension mount 116 at a first front suspension mount securement location 113. The first joint portion 132 may be detached from the first side support 112 and the first front suspension mount 116 at a position between the first side support securement location 111 and the first front suspension mount securement location 113. Similarly, the second joint portion 134 may be coupled to the second side support 114 at a second side support securement location 115. The second joint portion 134 may also be coupled to the second front suspension mount 118 at a second front suspension mount securement location 117. The second joint portion 134 may be detached from the second side support 114 and the second front suspension mount 118 at a position between the second side support securement location 115 and the second front suspension mount securement location 117. The first joint portion 132 and the second joint portion 134 may be coupled to the first side support 112, the second side support 114 and/or the first front suspension mount 116 and the second front suspension mount 118 through a variety of joining techniques including, but not limited to, mechanical fasteners, spot welds, weld joints, structural adhesives, brazes, shear pins, and the like.

In the depicted embodiment, the first joint portion 132 includes a first stiffness-reducing portion 136 positioned within a perimeter 144 of the first joint portion 132. Similarly, the second joint portion 134 includes a second stiffness-reducing portion 138 positioned within a perimeter 145 of the second joint portion 134. The first stiffness-reducing portion 136 and the second stiffness-reducing portion 138 define a yieldable area 140 that is positioned proximate to the first stiffness-reducing portion 136 and the second stiffness-reducing portion 138.

The first stiffness-reducing portion 136 and the second stiffness-reducing portion 138 may include a through hole 142 that extends through the first joint portion 132 and the second joint portion 134. In other embodiments, the first stiffness-reducing portion 136 and the second stiffness-reducing portion 138 may include a locally reduced thickness (not shown) that reduces the resistance to buckling of the respective first joint portion 132 or the second joint portion 134. In embodiments, the first joint portion 132 and/or the second joint portion 134 have a buckling strength evaluated in the vehicle longitudinal direction. The buckling strength of the first joint portion 132 and/or the second joint portion 134 is less than a buckling strength of the first front suspension mount 116 and/or the second front suspension mount 118 evaluated in the vehicle longitudinal direction.

The cross-vehicle stabilizing structure 130 further includes a cross-vehicle stabilizer portion 150 that is positioned between and coupled to the first joint portion 132 and the second joint portion 134. In embodiments, the cross-vehicle stabilizer portion 150 may include a rigid body extending between the first joint portion 132 and the second joint portion 134. As used herein, "rigid" refers to the stiffness of the cross-vehicle stabilizer portion 150 as compared to the first joint portion 132 and the second joint portion 134 to which the cross-vehicle stabilizer portion 150 is attached. In some embodiments, the stiffness of the cross-vehicle stabilizer portion 150 is at least twice the stiffness of the first joint portion 132 and the second joint portion 134 when evaluated in the vehicle lateral direction. The cross-vehicle stabilizer portion 150 may be coupled to the first joint portion 132 at a first attachment pivot 146. Similarly, the cross-vehicle stabilizer portion 150 may be coupled to the second joint portion 134 at a second attachment pivot 148.

The cross-vehicle stabilizer portion 150 has an effective length 300 that is evaluated between the first joint portion 132 and the second joint portion 134, where the effective length 300 may be fixed during normal vehicle operation. The cross-vehicle stabilizer portion 150 may be coupled to the first joint portion 132 and the second joint portion 134 through a variety of joining techniques including, but not limited to, mechanical fasteners, spot welds, weld joints, structural adhesives, brazes, shear pins, and the like.

Referring to FIG. 2B, the cross-vehicle stabilizer portion 150 may be coupled to the first joint portion 132 by inserting at least a portion of the cross-vehicle stabilizer portion 150 within the first joint portion 132 at the first attachment pivot 146. By positioning at least a portion of the cross-vehicle stabilizer portion 150 within the first joint portion 132, mechanical interference between the cross-vehicle stabilizer portion 150 and the first joint portion 132 restricts movement of the cross-vehicle stabilizer portion 150 relative to the first joint portion 132 in the vehicle longitudinal direction. Similarly, the cross-vehicle stabilizer portion 150 may be coupled to the second joint portion 134 by inserting at least a portion of the cross-vehicle stabilizer portion 150 within the second joint portion 134 at the second attachment pivot 148. By positioning a portion of the cross-vehicle stabilizer portion 150 within the second joint portion 134, mechanical interference between the cross-vehicle stabilizer portion 150 and the second joint portion 134 restricts movement of the cross-vehicle stabilizer portion 150 relative to the second joint portion 134 in the vehicle longitudinal direction.

Accordingly, through the first joint portion 132, the cross-vehicle stabilizer portion 150 and the second joint portion 134, the first side support 112 is coupled to the second side support 114. Because the first side support 112 is coupled to the second side support 114 through the cross-vehicle stabilizing structure 130, the cross-vehicle stabilizing structure 130 may resist relative movement of the first side support 112 and the second side support 114 in the vehicle lateral direction (i.e., in the +/−vehicle Y-direction depicted in FIG. 2A), as will be described in greater detail herein.

When a vehicle is involved in a collision, vehicle structures may elastically and plastically deform while the vehicle slows from its previous operating speed. The collision diverts the energy associated with the moving vehicle into energy that deforms the vehicle structures. The vehicle structures may be designed to accommodate such collision events, such that the energy associated with the collision may be controllably dissipated through selective and preferential deformation of the vehicle structures.

When a vehicle is involved in a small overlap collision, for example when only a portion of the front bumper contacts a barrier, some of the energy dissipation elements of the vehicle structure may not be initiated or may only be partially initiated, such that some of the energy dissipation elements of the vehicle do not dissipate energy to their full energy absorbing capacity. Further, in small overlap collisions, the energy that is introduced to the vehicle structures may be non-symmetrical across the vehicle width. Accordingly, the response of the vehicle structures to the energy introduced by the small overlap collisions may induce a non-symmetrical response to the vehicle structures.

Referring to FIG. 3, when the vehicle 100 strikes or is struck by a barrier 20, the structures of the vehicle plastically and elastically deform to absorb the energy of the impact. One of the front corners may strike the barrier 20 in what is referred to herein as a small front bumper overlap or small offset. While the vehicle 100 depicted in FIG. 3 shows a barrier 20 striking the front corner of the vehicle 100 proximate to the first side support 112, it should be understood that many of the vehicle structures of the vehicle 100 are generally symmetric about the vehicle centerline 10. Accordingly, the symmetrical structures of the vehicle would perform similarly when a barrier strikes proximate to the second side support 114. More specifically, the second joint portion 134 and the second side support 114 would act similarly and in a symmetrical manner to the collision depicted in FIG. 3 when a barrier strikes the vehicle proximate to the second side support 114.

Because only a small portion of the front bumper (not depicted) of the vehicle 100 strikes or is struck by the barrier 20 during a small front bumper overlap collision (for example, approximately 25% of the front bumper), energy absorbing structures associated with the front bumper may have a reduced effect on the dissipation of energy of the impact. Instead, the energy from the impact may be directed into the first side support 112, as depicted in FIG. 3. As the energy from the impact is directed into the first side support 112, the first side support 112 plastically and elastically deforms and translates rearward, absorbing energy from the impact.

The first side support 112 may also deflect inboard and away from the impact. Because the first front suspension mount 116 is coupled to the first side support 112, the first front suspension mount 116 and the front suspension unit 109 coupled to the first front suspension mount 116 may similarly deflect inboard and away from the impact. The tendency for the first side support 112 and the first front suspension mount 116 to deflect inboard may be exacerbated by the shape of the front-quarter panels of the unibody 110. When the first side support 112 deflects inboard and away from the impact, the first side support 112 may absorb less energy from the impact than when the first side support 112 remains near its original longitudinal orientation. When the first front suspension mount 116 deflects inboard and away from the impact, the front suspension unit 109 coupled to the first front suspension mount 116 may deflect inboard and translate rearward in the vehicle longitudinal direction. As the front suspension unit 109 deflects inboard and translates rearward, the front suspension unit 109 may transmit more energy associated with the collision to the cabin 108 as compared to collisions in which the front suspension unit 109 is not deflected inboard.

As discussed hereinabove, the first side support 112 is coupled to the second side support 114 through the cross-vehicle stabilizing structure 130, which collectively includes the first joint portion 132, the cross-vehicle stabilizer portion 150, and the second joint portion 134. Because the first side support 112 is coupled to the second side support 114 through the cross-vehicle stabilizing structure 130, the cross-vehicle stabilizing structure 130 and the second side support 114 may at least partially resist the inboard deflection of the first side support 112 and the first front suspension mount 116. By at least partially resisting the inboard deflection of the first side support 112 and the first front suspension mount 116, the cross-vehicle stabilizing structure 130 assists in maintaining the first side support 112 and the first front suspension mount 116 in their original longitudinal orientation. By maintaining the first side support 112 in its original longitudinal orientation, the first side support 112 may absorb more energy from the impact than when the first side support 112 deflects inboard and away from the impact. Further, when the first side support 112 is maintained near its original longitudinal orientation, the first side support 112 may transfer more energy to the A-pillar 120 than when the first side support 112 deflects inboard and away from the impact. Additionally, when the first front suspension mount 116 and the front suspension unit 109 coupled to the first front suspension mount 116 is maintained near their original orientation, less energy associated with the collision may be transferred to the cabin 108 from the front suspension unit 109. Accordingly, by maintaining the first side support 112 near its original longitudinal orientation, the cross-vehicle stabilizing structure 130 assists in distributing energy from the impact from the first side support 112 to the A-pillar 120, which may subsequently be distributed around the cabin 108.

As discussed hereinabove, the first joint portion 132 may include a first stiffness-reducing portion 136 that may include a through hole 142 that extends through the first joint portion 132. As the first side support 112 deforms and translates rearward, the first joint portion 132 may also deform and translate rearward as energy from the impact is directed into the first side support 112. Because the first joint portion 132 deforms as energy from the impact is directed into the first side support 112, the first joint portion 132 may simultaneously absorb energy from the impact. The first joint portion 132 may supplement the energy absorption capacity of the first side support 112.

The first stiffness-reducing portion 136 may be tuned, for example by selecting different sizes and/or shapes of the through hole 142 such that the first joint portion 132 selectively deforms, decreasing the stiffness of the first joint portion 132 and decreasing the energy absorption capacity of the first joint portion 132. In some embodiments, the reduced stiffness of the first joint portion 132 introduced by the first stiffness-reducing portion 136 may also strengthen the attachment between the first joint portion 132 and the underlying vehicle structure (i.e., the first side support 112 and/or the first front suspension mount 116) to which the first joint portion 132 is attached. By reducing the stiffness of the first joint portion 132, the first joint portion 132 may react in a similar manner to the introduction of energy associated with the impact as the underlying vehicle structure. Therefore, as the underlying vehicle structure elastically and plastically deforms, the first joint portion 132 similarly elastically and plastically deforms. By matching the deformation of the first joint portion 132 and the underlying vehicle structure, stress in the connection between the first joint portion 132 and the underlying vehicle structure may be minimized, such that the likelihood of separation of the first joint portion 132 from the underlying vehicle structure is minimized.

Additionally, as described hereinabove, the first joint portion 132 may be coupled to the first side support 112 at a first side support securement location 111, and the first joint portion 132 may be coupled to the first front suspension mount 116 at a first front suspension mount securement location 113. The first joint portion 132 may also be detached from the first side support 112 and the first front suspension mount 116 at a position between the first side support securement location 111 and the first front suspension mount securement location 113. Because the first joint portion 132 may be detached between the first side support securement location 111 and the first front suspension mount securement location 113, the first joint portion 132 may selectively deform between the first side support securement location 111 and the first front suspension mount securement location 113. Because the first joint portion 132 may selectively deform between the first side support securement location 111 and the first front suspension mount securement location 113, the first joint portion 132 may react in a similar manner to the introduction of energy associated with the impact as the underlying vehicle structure. By matching the deformation of the first joint portion 132 and the underlying vehicle structure, stress in the connection between the first joint portion 132 and the underlying vehicle structure may be minimized, such that the likelihood of separation of the first joint portion 132 from the underlying vehicle structure is minimized.

Further, as described hereinabove, the first joint portion 132 may be positioned such that at least a portion of the first joint portion 132 is positioned forward of the first front suspension mount 116 in the vehicle longitudinal direction. As also described hereinabove, the first joint portion 132 has a buckling strength evaluated in the vehicle longitudinal direction that is less than a buckling strength of the first front suspension mount 116 evaluated in the vehicle longitudinal direction. Because the first joint portion 132 may be positioned such that at least a portion of the first joint portion 132 is positioned forward of the first front suspension mount 116, energy associated with the impact may be directed into the first joint portion 132 before being directed into the first front suspension mount 116. As the first joint portion 132 has a lower buckling strength than the first front suspension mount 116, the first joint portion 132 may elastically and plastically deform to absorb energy that would otherwise be directed into the first front suspension mount 116. Accordingly, the first joint portion 132 may reduce the energy that is directed into the first front suspension mount 116, which may subsequently be directed into the cabin 108 of the vehicle 100.

As the first side support 112 deforms and translates rearward, the cross-vehicle stabilizer portion 150 and the first joint portion 132 translate in a generally rearward direction. In some embodiments, the cross-vehicle stabilizer portion 150 may pivot in direction 16 at a position proximate to the second attachment pivot 148 of the second joint portion 134. Because the cross-vehicle stabilizer portion 150 has an effective length 300 that may be fixed during normal vehicle operation, as the first joint portion 132 and the cross-vehicle stabilizer portion 150 translate about the second attachment pivot 148, the cross-vehicle stabilizing structure 130 may allow some inboard deflection of the first side support 112 as the cross-vehicle stabilizing structure 130 pivots about the second attachment pivot 148.

Figure 4A:
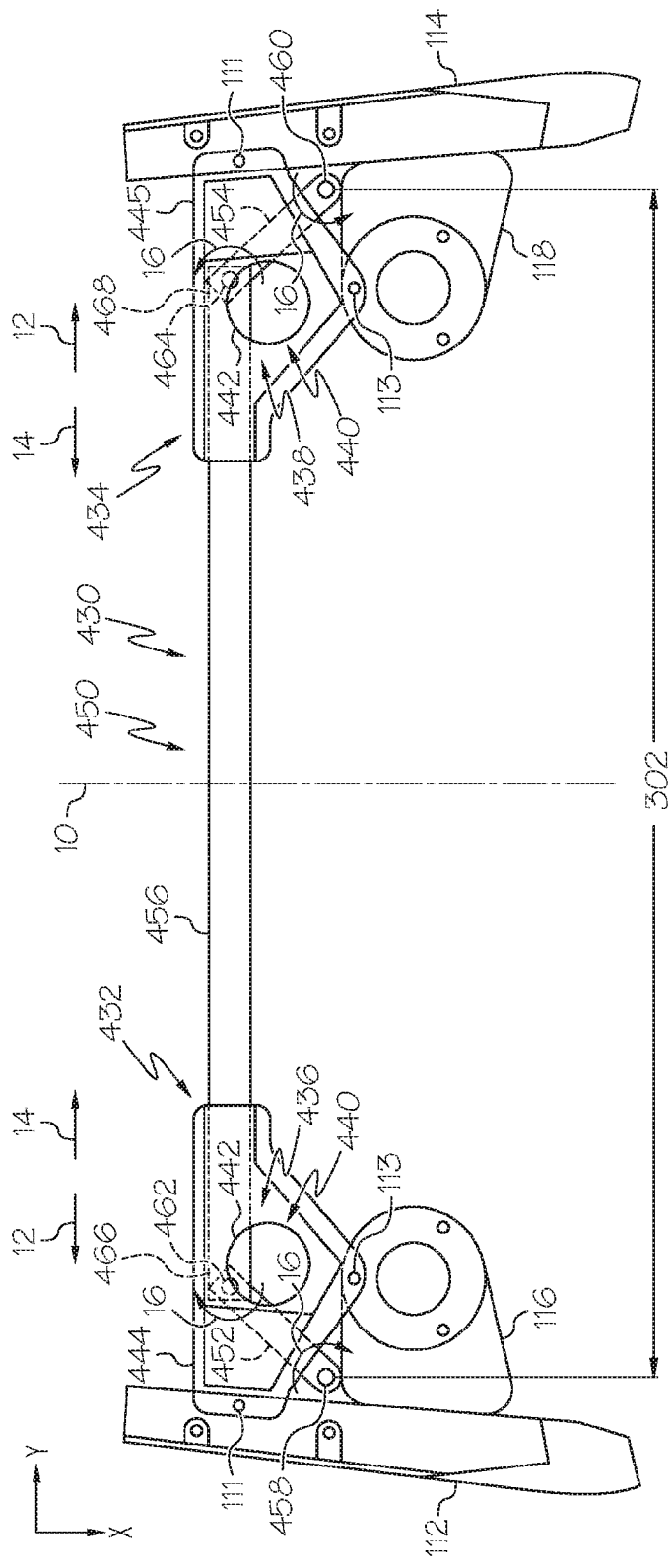
FIG. 4A schematically depicts a top view of a cross-vehicle stabilizing structure according to one or more embodiments shown or described herein.
Figure 4C:
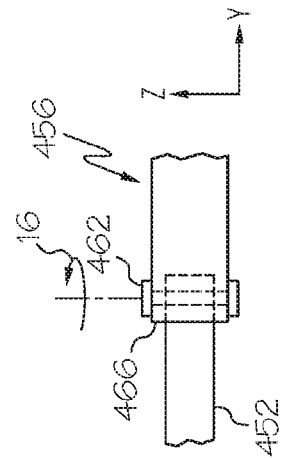
FIG. 4C schematically depicts an enlarged side view of a cross-vehicle stabilizing structure according to one or more embodiments shown or described herein.
Figure 4B:
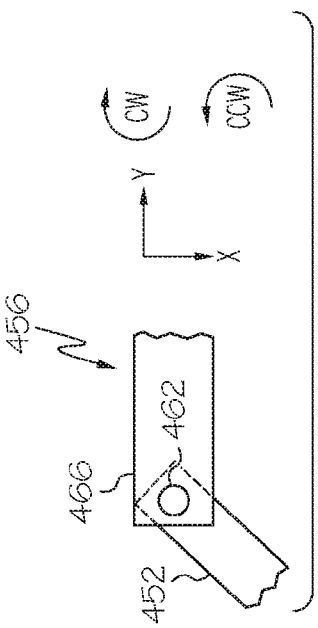
FIG. 4B schematically depicts an enlarged top view of a cross-vehicle stabilizing structure according to one or more embodiments shown or described herein.

Referring now to FIGS. 4A and 4B, in another embodiment, the vehicle 100 may include a cross-vehicle stabilizing structure 430 that extends between the first side support 112 and the second side support 114. The cross-vehicle stabilizing structure 430 includes a first joint portion 432 and a second joint portion 434. The cross-vehicle stabilizer portion 450 also includes a first stabilizer portion 452, a second stabilizer portion 454, and a central stabilizer portion 456.

The cross-vehicle stabilizing structure 430 extends between the first side support 112 and the second side support 114 of the unibody 110. The cross-vehicle stabilizing structure 430 may include a first joint portion 432 that is coupled to the first side support 112. The cross-vehicle stabilizing structure 430 may also include a second joint portion 434 that is coupled to the second side support 114. In some embodiments, the first joint portion 432 may be coupled to the first front suspension mount 116. Similarly, the second joint portion 434 may be coupled to the second front suspension mount 118. In embodiments, at least a portion of the first joint portion 432 may be positioned forward of the first front suspension mount 116.

The first joint portion 432 may be coupled to the first side support 112 at a first side support securement location 111. The first joint portion 432 may also be coupled to the first front suspension mount 116 at a first front suspension mount securement location 113. The first joint portion 432 may be detached from the first front side support 112 and the first front suspension mount 116 at a position between the first side support securement location 111 and the first front suspension mount securement location 113. The first joint portion 432 and the second joint portion 434 may be coupled to the first side support 112, the second side support 114 and/or the first front suspension mount 116 and the second front suspension mount 118 through a variety of joining techniques including, but not limited to, mechanical fasteners, spot welds, weld joints, structural adhesives, brazes, shear pins, and the like.

The first joint portion 432 may include a first stiffness-reducing portion 436 that is positioned within a perimeter 444 of the first joint portion 432. Similarly, the second joint portion 434 may include a second stiffness-reducing portion 438 that is positioned within a perimeter 445 of the second joint portion 434. The first stiffness-reducing portion 436 and the second stiffness-reducing portion 438 define a yieldable area 440 that is positioned proximate to the first stiffness-reducing portion 436 and the second stiffness-reducing portion 438.

In some embodiments, the first stiffness-reducing portion 436 and the second stiffness-reducing portion 438 may include a through hole 442 that extends through the first joint portion 432 and the second joint portion 434. In other embodiments, the first stiffness-reducing portion 436 and the second stiffness-reducing portion 438 may include a locally reduced thickness (not shown) that reduces the resistance to buckling of the respective first joint portion 432 or the second joint portion 434. In embodiments, the first joint portion 432 and/or the second joint portion 434 have a buckling strength evaluated in the vehicle longitudinal direction. The buckling strength of the first joint portion 432 and/or the second joint portion 434 is less than a buckling strength of the first front suspension mount 116 and/or the second front suspension mount 118 evaluated in the vehicle longitudinal direction.

The cross-vehicle stabilizing structure 430 further includes a cross-vehicle stabilizer portion 450. The cross-vehicle stabilizer portion 450 includes a first stabilizer portion 452, a second stabilizer portion 454 and a central stabilizer portion 456. The first stabilizer portion 452 of the cross-vehicle stabilizing structure 430 may be coupled to the first joint portion 432. The second stabilizer portion 454 of the cross-vehicle stabilizing structure 430 may be coupled to the second joint portion 434. Through the first joint portion 432 and the second joint portion 434, the first stabilizer portion 452 may be coupled to the first side support 112 and the second stabilizer portion 454 may be coupled to the second side support 114. Alternatively, the first stabilizer portion 452 may be coupled to the first front suspension mount 116 and the second stabilizer portion 454 may be coupled to the second front suspension mount 118.

The cross-vehicle stabilizer portion 450 has an effective length 302 that is evaluated between the first joint portion 432 and the second joint portion 434. The first stabilizer portion 452 and the second stabilizer portion 454 may be coupled to the first joint portion 432 and the second joint portion 434 through a variety of joining techniques including, but not limited to, mechanical fasteners, spot welds, weld joints, structural adhesives, brazes, shear pins, and the like.

Additionally, the first stabilizer portion 452 may be coupled to the first front suspension mount 116 and/or the first side support 112 at a first securement location 458. In embodiments where the first stabilizer portion 452 is solely coupled to the first side support 112, the first securement location 458 may be positioned forward of the first front suspension mount 116 in the vehicle longitudinal direction. In some embodiments, the first stabilizer portion 452 may be pivotally coupled to the first front suspension mount 116 and/or the first side support 112 at the first securement location 458, such that the first stabilizer portion 452 may pivot in direction 16 about the first securement location 458. Similarly, the second stabilizer portion 454 may be coupled to the second front suspension mount 118 and/or the second side support 114 at a second securement location 460. In embodiments where the second stabilizer portion 454 is solely coupled to the second side support 114, the second securement location 460 may be positioned forward of the second front suspension mount 118 in the vehicle longitudinal direction. In some embodiments, the second stabilizer portion 454 may be pivotally coupled to the second front suspension mount 118 and/or the second side support 114 at the second securement location 460, such that the second stabilizer portion 454 may pivot in direction 16 about the second securement location 460. The first securement location 458 may be positioned proximate to the first joint portion 432 in the vehicle lateral direction. Similarly the second securement location 460 may be positioned proximate to the second joint portion 434 in the vehicle lateral direction. Accordingly, the effective length 302 of the cross-vehicle stabilizer portion may also be evaluated between the first securement location 458 and the second securement location 460. The first stabilizer portion 452 and the second stabilizer portion 454 may be coupled at the first securement location 458 and the second securement location 460 by various joining techniques including, but not limited to, use of a pinned connection.

The central stabilizer portion 456 is coupled to the first stabilizer portion 452 and the second stabilizer portion 454 and is positioned between the first stabilizer portion 452 and the second stabilizer portion 454 in the vehicle lateral direction. The central stabilizer portion 456 may be positioned forward of the first securement location 458 and the second securement location 460 in the vehicle longitudinal direction, such that the first stabilizer portion 452 and the second stabilizer portion 454 are angled forward from the respective first securement location 458 and the second securement location 460.

In some embodiments, the first stabilizer portion 452 may be pivotally coupled to the central stabilizer portion 456 at a first inner pivot joint 462, such that the first stabilizer portion 452 and the central stabilizer portion 456 may pivot about the first inner pivot joint 462 in direction 16. Similarly, the second stabilizer portion 454 may be pivotally coupled to the central stabilizer portion 456 at a second inner pivot joint 464, such that the second stabilizer portion 454 and the central stabilizer portion 456 may pivot about the second inner pivot joint 464 in direction 16. The first stabilizer portion 452 and the second stabilizer portion 454 may also be pivotally coupled to one another through the central stabilizer portion 456. The first stabilizer portion 452 and the second stabilizer portion 454 may be pivotally coupled to the central stabilizer portion 456 through a variety of joining techniques including, but not limited to, a pinned connection.

Referring to FIGS. 4A-4C, the first inner pivot joint 462 may include a first limiting portion 466. Similarly, the second inner pivot joint 464 may include a second limiting portion 468. Referring to FIG. 4B, an enlarged view of the first inner pivot joint 462 is depicted. While the first inner pivot joint 462 and first limiting portion 466 are depicted, it should be understood the description made herein may apply to the second inner pivot joint 464 and second limiting portion 468. More specifically, the second inner pivot joint 464 would perform in a symmetrical manner to the first inner pivot joint 462 depicted in FIGS. 4B and 4C.

The first stabilizer portion 452 may be pivotally coupled to the central stabilizer portion 456 such that at least a portion of the first stabilizer portion 452 overlaps with and/or is positioned within the central stabilizer portion 456. Because at least a portion of the first stabilizer portion 452 overlaps with and/or is positioned within the central stabilizer portion 456, a portion of the central stabilizer portion 456 may form the first limiting portion 466. Because the first stabilizer portion 452 overlaps with and/or is positioned within the central stabilizer portion 456, the central stabilizer portion 456 may provide a mechanical interference at the first limiting portion 466. The central stabilizer portion 456 may provide a mechanical interference at the first limiting portion 466 when the first stabilizer portion 452 and/or the central stabilizer portion 456 is rotated in the clockwise or the counter-clockwise direction about the first inner pivot joint 462. The first limiting portion 466 may restrict rotation of the central stabilizer portion 456 about the first inner pivot joint 462 in a counter-clockwise direction (i.e., in the +CCW-direction depicted in FIG. 4B) such that the first stabilizer portion 452 and the central stabilizer portion 456 are free to rotate in the clockwise direction until the first stabilizer portion 452 is substantially parallel to the central stabilizer portion 456. The first limiting portion 466 may restrict a rotation of the central stabilizer portion 456 about the first inner pivot joint 462 in a clockwise direction (i.e., in the +CW-direction depicted in FIG. 4B) such that the orientation of the first stabilizer portion 452 with respect to the central stabilizer portion 456 is maintained in the position shown in FIGS. 4A and 4B.

Similarly, the second stabilizer portion 454 may be pivotally coupled to the central stabilizer portion 456 such that at least a portion of the second stabilizer portion 454 overlaps with and/or is positioned within the central stabilizer portion 456. Because at least a portion of the second stabilizer portion 454 overlaps with and/or is positioned within the central stabilizer portion 456, a portion of the central stabilizer portion 456 may form the second limiting portion 468. Because the second stabilizer portion 454 overlaps with and/or is positioned within the central stabilizer portion 456, the central stabilizer portion 456 may provide a mechanical interference at the second limiting portion 468. The central stabilizer portion 456 may provide a mechanical interference at the second limiting portion 468 when the second stabilizer portion 454 and/or the central stabilizer portion 456 are rotated in the clockwise or the counter-clockwise direction about the second inner pivot joint 464. The second limiting portion 468 may restrict rotation of the central stabilizer portion 456 about the second inner pivot joint 464 in the counter-clockwise direction such that the second stabilizer portion 454 and the central stabilizer portion 456 are free to rotate in the counter-clockwise direction until the second stabilizer portion 454 is substantially parallel to the central stabilizer portion 456. The second limiting portion 468 may restrict a rotation of the central stabilizer portion 456 about the second inner pivot joint 464 in the clockwise direction such that the orientation of the second stabilizer portion 454 with respect to the central stabilizer portion 456 is maintained in the position shown in FIG. 4A.

Figure 5:
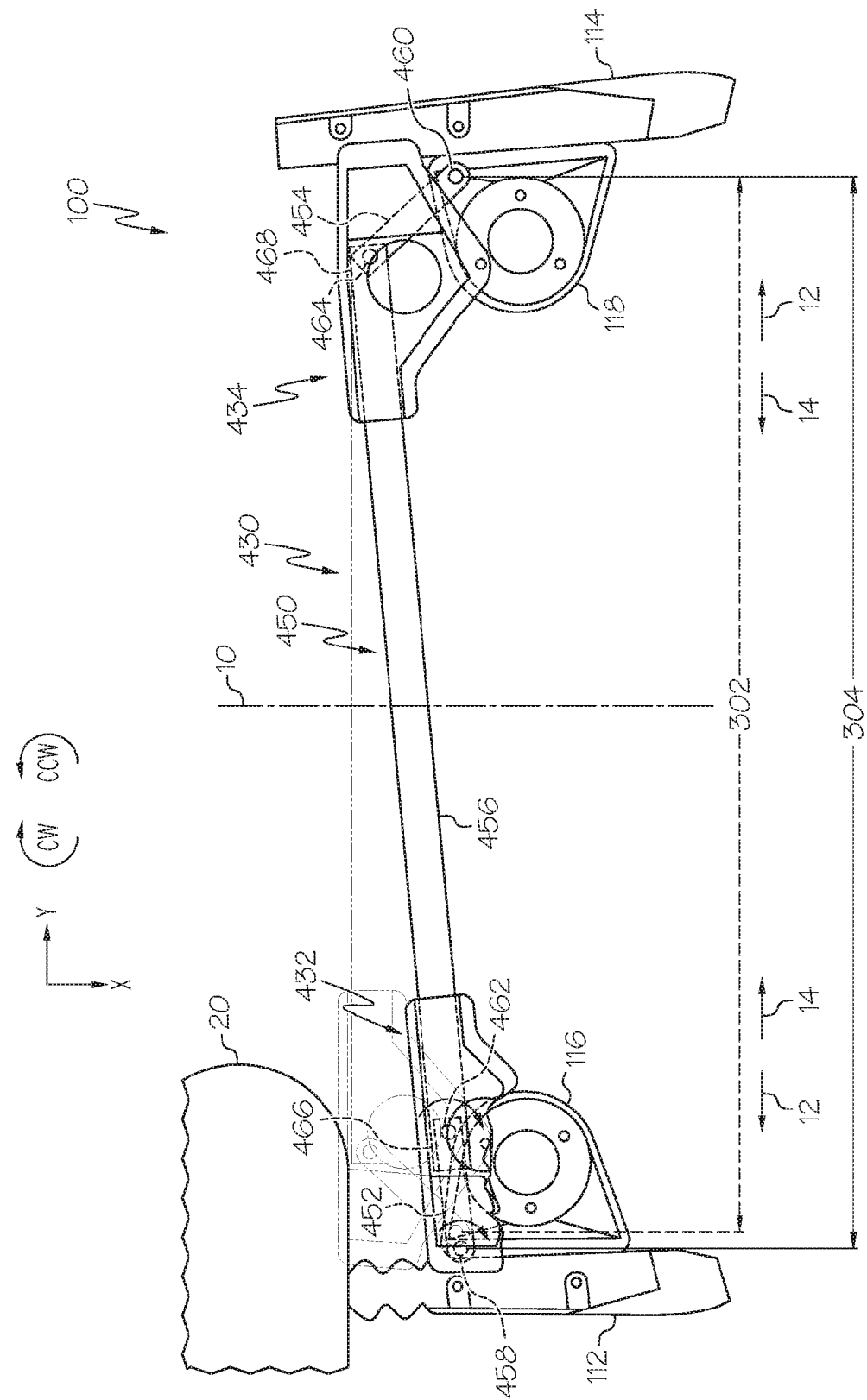
FIG. 5 schematically depicts a top view of a cross-vehicle stabilizing structure and a side support under deformation according to one or more embodiments shown or described herein.

The cross-vehicle stabilizer portion 450 is repositionable between a deactivated position, as shown in FIGS. 4A and 4B, and an activated position, as shown in FIG. 5. The cross-vehicle stabilizer portion 450 is nominally oriented in the deactivated position, as shown in FIGS. 4A and 4B, during normal vehicle 100 operation. When the vehicle 100 strikes a barrier 20, as depicted in FIG. 5, the cross-vehicle stabilizer portion 450 is repositioned into the activated position.

As discussed above, when the vehicle 100 strikes or is struck by a barrier 20, the structures of the vehicle plastically and elastically deform to absorb the energy of the impact. As described above, in a small front bumper overlap collision, energy from the impact may be primarily directed into the first side support 112. While the vehicle 100 depicted in FIG. 5 shows a barrier 20 striking the front corner of the vehicle 100 proximate to the first side support 112, it should be understood that the vehicle 100 is symmetric about the vehicle centerline 10. Accordingly, the structures of the vehicle would perform similarly when a barrier strikes proximate to the second side support 114. Further, the second stabilizer portion 454, second joint portion 434, second inner pivot joint 464, and the second side support 114 would act similarly and in a symmetrical manner to the collision depicted in FIG. 5 when a barrier strikes the vehicle proximate to the second side support 114.

Because only a small portion of the front bumper (not depicted) of the vehicle 100 strikes or is struck by the barrier 20 during a small front bumper overlap collision, energy absorbing structures associated with the front bumper, particularly the energy absorbing structures positioned along the opposite side of the vehicle 100, may have a reduced effect on the dissipation of energy of the impact. Instead, the energy from the impact may be directed into the first side support 112, as depicted in FIG. 5. As the energy from the impact is directed into the first side support 112, the first side support 112 plastically and elastically deforms and translates rearward, absorbing energy from the impact.

As discussed hereinabove, the first side support 112 is coupled to the second side support 114 through the cross-vehicle stabilizing structure 430 that collectively includes the first joint portion 432, the cross-vehicle stabilizer portion 450, and the second joint portion 434. Because the first side support 112 is coupled to the second side support 114 through the cross-vehicle stabilizing structure 430, the cross-vehicle stabilizing structure 430 and the second side support 114 may resist the inboard deflection of the first side support 112.

Referring to FIG. 5, as the first side support 112 deforms and translates rearward, the deformation and translation of the first side support 112 may cause the first stabilizer portion 452 and the central stabilizer portion 456 rotate about the first inner pivot joint 462. As discussed above, the first limiting portion 466 of the central stabilizer portion 456 may restrict rotation of the central stabilizer portion 456 in the clockwise direction about the first inner pivot joint 462. The first stabilizer portion 452 and the central stabilizer portion 456 may freely rotate relative to one another until the first stabilizer portion 452 is substantially parallel to the central stabilizer portion 456, and the first limiting portion 466 restricts rotation of the central stabilizer portion 456 about the first inner pivot joint 462. According to the depicted embodiment, in the activated position, the first stabilizer portion 452 may be substantially parallel to the central stabilizer portion 456.

As the first side support 112 deforms and translates rearward, the deformation and translation of the first side support may cause the central stabilizer portion 456 and the second stabilizer portion 454 to rotate about the second inner pivot joint 464. As described above, the second limiting portion 468 may restrict counter-clockwise rotation of the central stabilizer portion 456 about the second inner pivot joint 464, such that the orientation of the second stabilizer portion 454 with respect to the central stabilizer portion 456 is maintained in the position shown in FIGS. 4A, 4B, and 5.

When the cross-vehicle stabilizer portion 450 is in the activated position, i.e., when the first stabilizer portion 452 and the central stabilizer portion 456 are approximately parallel, as depicted in FIG. 5, the cross-vehicle stabilizer portion 450 has an effective length 304 evaluated between the first joint portion 432 at first securement location 458 and the second joint portion 434 at the second securement location 460. Because the central stabilizer portion 456 may be positioned forward of the first securement location 458, as the first stabilizer portion 452 and the central stabilizer portion 456 rotate about the first inner pivot joint 462, the distance between the first securement location 458 and the second securement location 460 increases. Accordingly, when the cross-vehicle stabilizer portion 450 is in the activated position, the effective length 304 may be greater than the effective length 302 of the cross-vehicle stabilizer portion 450 in the deactivated position. Because the cross-vehicle stabilizer portion 450 has a longer effective length in the activated position than the deactivated position, during a small front bumper offset collision, the cross-vehicle stabilizer portion 450 may resist inboard deflection of the first side support 112. Because the first front suspension mount 116 is coupled to the first side support 112, the cross-vehicle stabilizer portion 450 may resist inboard deflection of the first front suspension mount 116 and the front suspension unit 109 coupled to the first front suspension mount 116. Additionally, because the cross-vehicle stabilizer portion 450 is coupled to both the first side support 112 and the second side support 114, when the cross-vehicle stabilizer portion 450 is in the activated position, the cross-vehicle stabilizer portion 450 may transfer energy associated with the collision from the side support that is being impacted (for example, the first side support 112) to the side support that is not being impacted (for example, the second side support 114).

By resisting the inboard deflection of the first side support 112 and the first front suspension mount 116, the cross-vehicle stabilizing structure 430 may assist in maintaining the first side support 112 close to its original longitudinal orientation. As discussed hereinabove, by maintaining the first side support 112 close to its original longitudinal orientation, the first side support 112 may absorb more energy from the impact than when the first side support 112 deflects inboard and away from the impact. Further, when the first side support 112 is maintained close to its original longitudinal orientation, the first side support may transfer more energy to the A-pillar 120 than when the first side support 112 is free to deflect inboard and away from the impact. Additionally, when the first front suspension mount 116 and the front suspension unit 109 which is coupled to the first front suspension mount 116 are maintained near their original orientation, less energy associated with the collision may be transferred to the cabin 108 from the front suspension unit 109. Accordingly, by maintaining the first side support 112 close to its original longitudinal orientation, the cross-vehicle stabilizing structure 430 may assist in distributing energy from the impact from the first side support 112 to the A-pillar 120.

As discussed hereinabove, the first joint portion 432 includes a first stiffness-reducing portion 436 that may include a through hole 442 that extends through the first joint portion 432. Additionally, as discussed above, the first stiffness-reducing portion 436 may include a locally reduced thickness (not shown) that reduces the resistance to buckling of the respective first joint portion 432. As the first side support 112 deforms and translates rearward, the first joint portion 432 may also deform and translate rearward as energy from the impact is directed into the first side support 112. Because the first joint portion 432 deforms as energy from the impact is directed into the first side support 112, the first joint portion 432 absorbs energy from the impact. The first stiffness-reducing portion 436 may be tuned, for example by selecting different sizes and/or shapes of the through hole 442 or the locally reduced thickness portion such that the first joint portion 432 has a tuned stiffness and/or strength. The first joint portion 432 may selectively deform during the impact, such that the first joint portion 432 dissipates energy associated with the impact.

In some embodiments, the reduced stiffness of the first joint portion 432 introduced by the first stiffness-reducing portion 436 may also strengthen the attachment between the first joint portion 432 and the underlying vehicle structure (the first side support 112 and/or the first front suspension mount 116) to which the first joint portion 432 is attached. By reducing the stiffness of the first joint portion 432, the first joint portion 432 may react in a similar manner to the introduction of energy associated with the impact as the underlying vehicle structure. Therefore, as the underlying vehicle structure elastically and plastically deforms, the first joint portion 432 similarly elastically and plastically deforms. By matching the deformation of the first joint portion 432 and the underlying vehicle structure, stress in the connection between the first joint portion 432 and the underlying vehicle structure may be minimized, such that the likelihood of separation of the first joint portion 432 from the underlying vehicle structure is minimized.

Additionally, as described hereinabove, the first joint portion 432 may be coupled to the first side support 112 at a first side support securement location 111, and the first joint portion 432 may be coupled to the first front suspension mount 116 at a first front suspension mount securement location 113. The first joint portion 132 may also be detached from the first side support 112 and the first front suspension mount 116 at a position between the first side support securement location 111 and the first front suspension mount securement location 113. Because the first joint portion 432 may be detached between the first side support securement location 111 and the first front suspension mount securement location 113, the first joint portion 432 may selectively deform between the first side support securement location 111 and the first front suspension mount securement location 113. Because the first joint portion 432 may selectively deform between the first side support securement location 111 and the first front suspension mount securement location 113, the first joint portion 432 may react in a similar manner to the introduction of energy associated with the impact as the underlying vehicle structure. By matching the deformation of the first joint portion 432 and the underlying vehicle structure, stress in the connection between the first joint portion 432 and the underlying vehicle structure may be minimized, such that the likelihood of separation of the first joint portion 432 from the underlying vehicle structure is minimized.

Further, as described hereinabove, the first joint portion 432 may be positioned such that at least a portion of the first joint portion 432 is positioned forward of the first front suspension mount 116 in the vehicle longitudinal direction. As also described hereinabove, the first joint portion 432 has a buckling strength evaluated in the vehicle longitudinal direction that is less than a buckling strength of the first front suspension mount 116 evaluated in the vehicle longitudinal direction. Because the first joint portion 432 may be positioned such that at least a portion of the first joint portion 432 is positioned forward of the first front suspension mount 116, of energy associated with the impact may be directed into the first joint portion 432 before being directed into the first front suspension mount 116. As the first joint portion 432 has a lower buckling strength than the first front suspension mount 116, the first joint portion 432 may elastically and plastically deform to absorb energy that would otherwise be directed into the first front suspension mount 116. Accordingly, the first joint portion 432 may reduce the energy that is directed into the first front suspension mount 116, which may subsequently be directed into the cabin 108 of the vehicle 100.

Figure 6:
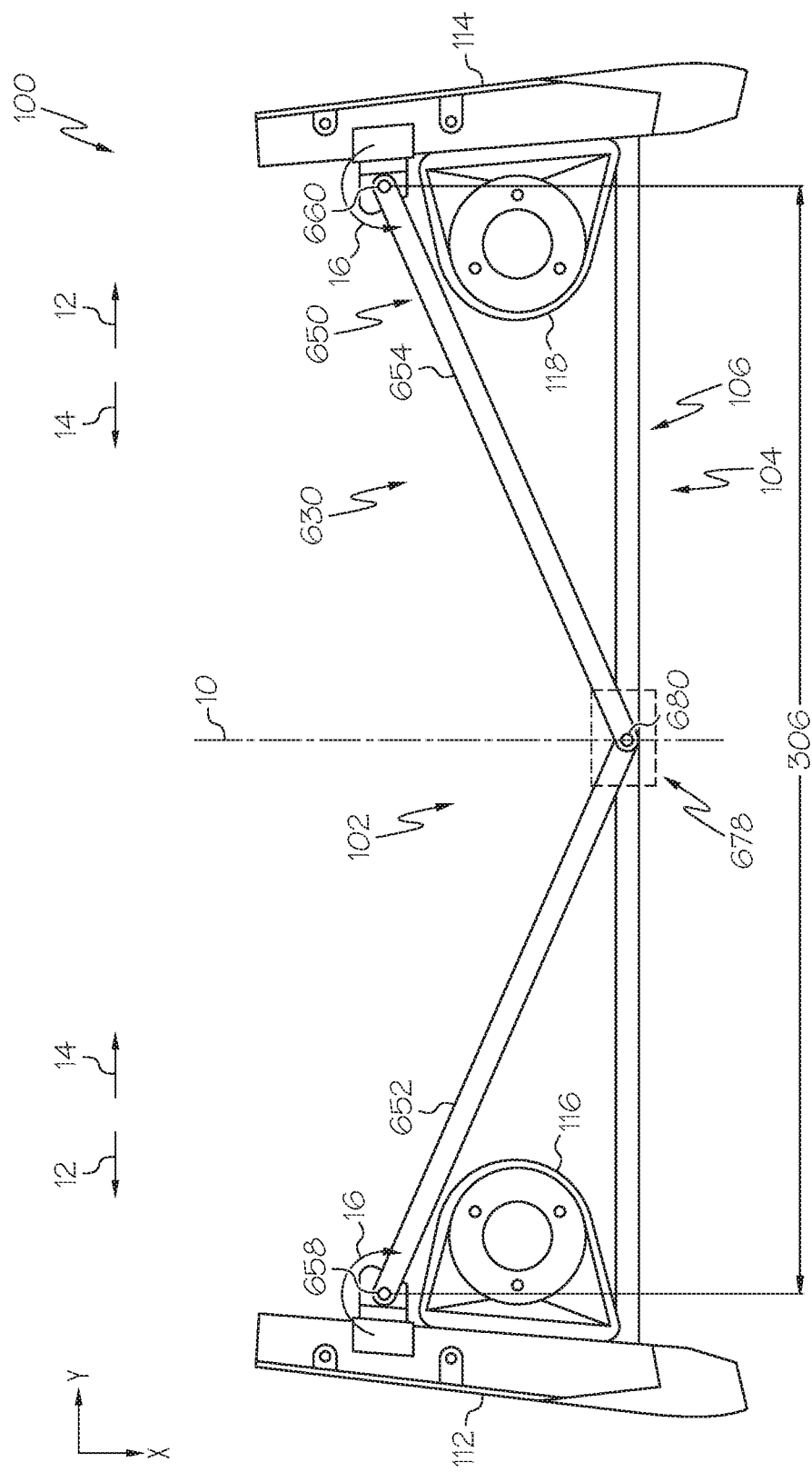
FIG. 6 schematically depicts a top view of a cross-vehicle stabilizing structure according to one or more embodiments shown or described herein.

Referring now to FIG. 6, in another embodiment, the vehicle 100 may include a cross-vehicle stabilizing structure 630 that extends between the first side support 112 and the second side support 114. The cross-vehicle stabilizer portion 650 includes a first stabilizer portion 652 that is coupled to the first side support 112 and a second stabilizer portion 654 that is coupled to the second side support 114. In the embodiment depicted in FIG. 6, the first stabilizer portion 652 is pivotally coupled to the second stabilizer portion 654 at a central joint portion 678.

The first stabilizer portion 652 of the cross-vehicle stabilizer portion 650 may be coupled to the first side support 112 at a first securement location 658. In some embodiments, the first stabilizer portion 652 is pivotally coupled to the first side support 112 at the first securement location 658. The first securement location 658 may be positioned forward of the first front suspension mount 116 in the vehicle longitudinal direction. Similarly, the second stabilizer portion 654 is coupled to the second side support 114 at a second securement location 660. In some embodiments, the second stabilizer portion 654 is pivotally coupled to the second side support 114 at the second securement location 660.

The cross-vehicle stabilizer portion 650 has an effective length 306 that is evaluated between the first securement location 658 and the second securement location 660. The second securement location 660 may be positioned forward of the second front suspension mount 118 in the vehicle longitudinal direction. The first stabilizer portion 652 and the second stabilizer portion 654 may be pivotally coupled to the first side support 112 and the second side support 114 through a variety of joining techniques including, but not limited to, a pinned connection.

As noted hereinabove, the first stabilizer portion 652 and the second stabilizer portion 654 are pivotally coupled to one another at a central joint portion 678. In some embodiments, such as the embodiment depicted in FIG. 6, the central joint portion 678 may include a single connection location 680 at which the first stabilizer portion 652 is pivotally coupled to the second stabilizer portion 654. In other embodiments, such as the embodiment depicted in FIG. 7, the central joint portion 678 may include multiple connection locations. In such embodiments, the first stabilizer portion 652 may be pivotally coupled to a lateral vehicle structure member 104 at a first connection location 682 at the central joint portion 678. The second stabilizer portion 654 may be pivotally coupled to the lateral vehicle structure member 104 at a second connection location 684 at the central joint portion 678, and the first stabilizer portion 652 and the second stabilizer portion 654 may be pivotally coupled to one another at the central joint portion 678 through the lateral vehicle structure member 104. In embodiments, the central joint portion 678 may be positioned rearward of the first securement location 658 and the second securement location 660 in the vehicle longitudinal direction. It should be understood that the first stabilizer portion 652 and the second stabilizer portion 654 may be pivotally coupled by any suitable joining technique, including through pinning, or securing with an eyebolt, a rod end, or the like.

In embodiments, the lateral vehicle structure member 104 may be positioned between the first side support 112 and the second side support 114 in an engine bay 102 of the vehicle 100. The lateral vehicle structure member 104 may include various mechanical structural elements that are coupled to the unibody 110. In some embodiments, the lateral vehicle structure member 104 may include a cowl structure 106 that extends in the vehicle lateral direction across the unibody 110, and is coupled, directly or indirectly, to the first side support 112 and the second side support 114. In some embodiments, the lateral vehicle structure member 104 may include a dash panel (not depicted) that extends between the first side support 112 and the second side support 114. In some embodiments, the cowl structure 106 of the lateral vehicle structural member 104 may be positioned rearward of the dash panel in the vehicle longitudinal direction.

In embodiments where the lateral vehicle structure member 104 includes a cowl structure 106, the central joint portion 678 may be coupled to the cowl structure 106. Because the cowl structure 106 may be coupled to the first side support 112 and the second side support 114, the central joint portion 678 may be coupled to the first and second side support 112, 114 through the cowl structure 106. The central joint portion 678 may be coupled to the lateral vehicle structure member 104 through a variety of joining techniques including, but not limited to, mechanical fasteners, spot welds, weld joints, structural adhesives, brazes, shear pins, and the like.

Figure 7:
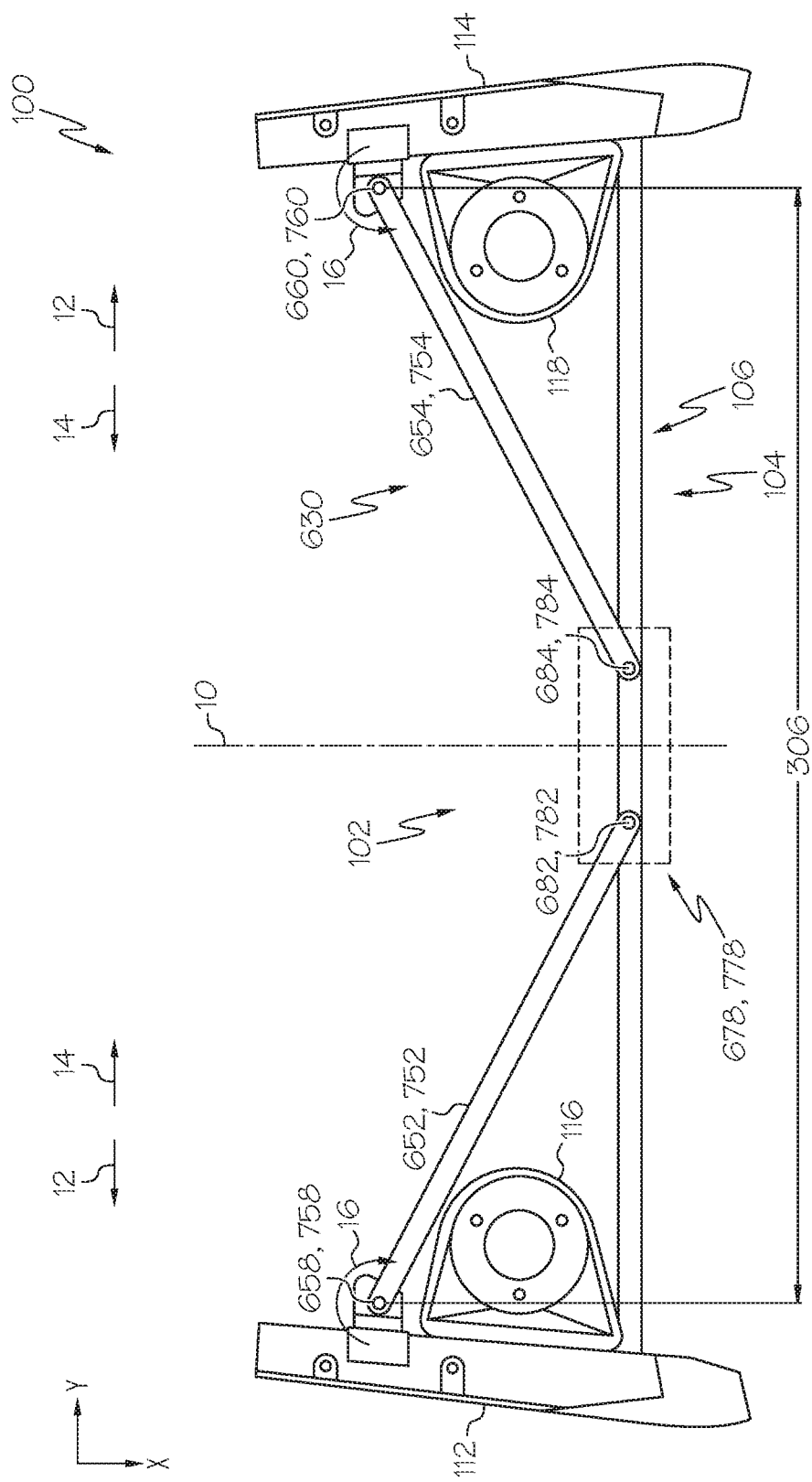
FIG. 7 schematically depicts a top view of a cross-vehicle stabilizing structure according to one or more embodiments shown or described herein.
Figure 8:
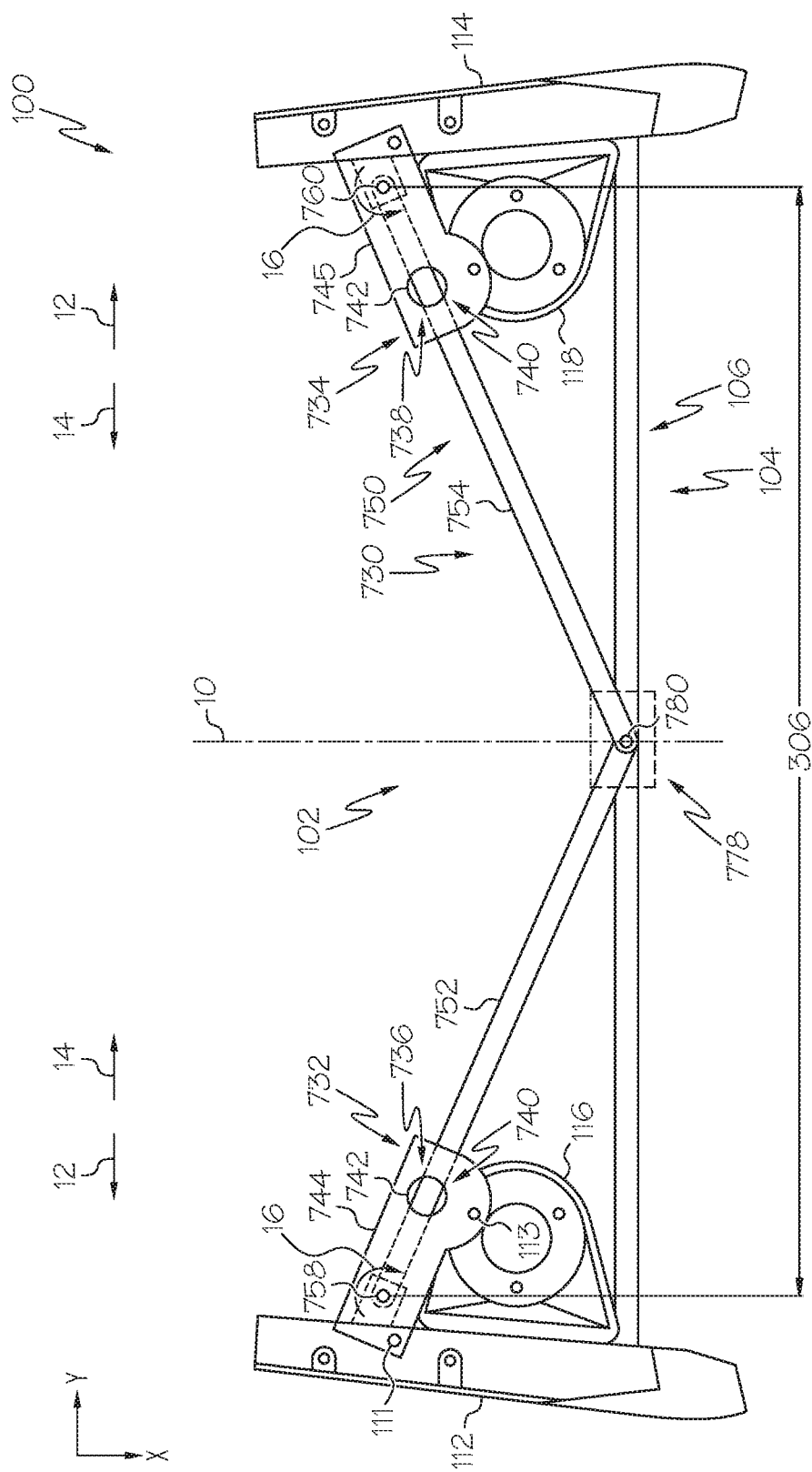
FIG. 8 schematically depicts a top view of a cross-vehicle stabilizing structure according to one or more embodiments shown or described herein.

Referring now to FIG. 8, in one embodiment, the vehicle 100 may include a cross-vehicle stabilizing structure 730 extending between the first side support 112 and the second side support 114. Similar to the embodiment described above with respect to FIGS. 6 and 7, the cross-vehicle stabilizer portion 750 includes a first stabilizer portion 752 that is pivotally coupled to a second stabilizer portion 754 at a central joint portion 778. However, in this embodiment, the cross-vehicle stabilizing structure 730 includes a first joint portion 732 coupled to the first side support 112 and a second joint portion 734 coupled to the second side support 114.

As described above, the first stabilizer portion 752 is coupled to the first side support 112 at a first securement location 758. In some embodiments, the first stabilizer portion 752 is pivotally coupled to the first side support 112 at the first securement location 758. The first securement location 758 may be positioned forward of the first front suspension mount 116 in the vehicle longitudinal direction.

Similarly, the second stabilizer portion 754 is coupled to the second side support 114 at a second securement location 760. In some embodiments, the second stabilizer portion 754 is pivotally coupled to the first side support 112 at the second securement location 760. The second securement location 760 may be positioned forward of the second front suspension mount 118 in the vehicle longitudinal direction. The cross-vehicle stabilizer portion 750 has an effective length 306 that is evaluated between the first securement location 758 and the second securement location 760. The first stabilizer portion 752 and the second stabilizer portion 754 may be pivotally coupled to the first side support 112 and the second side support 114 through a variety of joining techniques including, but not limited to, a pinned connection.

The first stabilizer portion 752 may also be coupled to a first joint portion 732 that is coupled to the first side support 112. The second stabilizer portion 754 may also be coupled to a second joint portion 734 that is coupled to the second side support 114. In embodiments, the first joint portion 732 may also be coupled to the first front suspension mount 116. Similarly, the second joint portion 734 may be coupled to the second front suspension mount 118. The first joint portion 732 may be positioned proximate to the first securement location 758 in the vehicle lateral direction. Similarly the second joint portion 734 may be positioned proximate to the second securement location 760 in the vehicle lateral direction. Accordingly, the effective length 306 of the cross-vehicle stabilizer portion 750 may also be evaluated between the first joint portion 732 and the second joint portion 734.

In embodiments, at least a portion of the first joint portion 732 may be positioned forward of the first front suspension mount 116. The first joint portion 732 may be coupled to the first side support 112 at a first side support securement location 111. The first joint portion 732 may also be coupled to the first front suspension mount 116 at a first front suspension mount securement location 113. The first joint portion 732 may be detached from the first front side support 112 and the first front suspension mount 116 at a position between the first side support securement location 111 and the first front suspension mount securement location 113. The first joint portion 732 and the second joint portion 734 may be coupled to the first side support 112, the second side support 114 and/or the first front suspension mount 116 and the second front suspension mount 118 through a variety of joining techniques including, but not limited to, mechanical fasteners, spot welds, weld joints, structural adhesives, brazes, shear pins, and the like.

The first joint portion 732 may include a first stiffness-reducing portion 736 positioned within a perimeter 744 of the first joint portion 732. Similarly, the second joint portion 734 may include a second stiffness-reducing portion 738 positioned within a perimeter 745 of the second joint portion 734. The first stiffness-reducing portion 736 and the second stiffness-reducing portion 738 define a yieldable area 740 positioned proximate to the first stiffness-reducing portion 736 and the second stiffness-reducing portion 738.

In embodiments, the first stiffness-reducing portion 736 and the second stiffness-reducing portion 738 may include a through hole 742 through the first joint portion 732 and the second joint portion 734. In embodiments, the first joint portion 732 and/or the second joint portion 734 have a buckling strength evaluated in the vehicle longitudinal direction. The buckling strength of the first joint portion 732 and/or the second joint portion 734 is less than a buckling strength of the first front suspension mount 116 and/or the second front suspension mount 118 evaluated in the vehicle longitudinal direction.

As noted hereinabove, the first stabilizer portion 752 and the second stabilizer portion 754 are pivotally coupled to one another at a central joint portion 778. In some embodiments, such as the embodiment depicted in FIG. 8, the central joint portion 778 may include a single connection location 780 at which the first stabilizer portion 752 and the second stabilizer portion 754 are pivotally coupled to one another. In other embodiments, such as the embodiment depicted in FIG. 7, the central joint portion 778 may include multiple connection locations. In such embodiments, the first stabilizer portion 752 may be pivotally coupled to a lateral vehicle structure member 104 at a first connection location 782 at the central joint portion 778. The second stabilizer portion 754 may be pivotally coupled to the lateral vehicle structure member 104 at a second connection location 784 at the central joint portion 778, and the first stabilizer portion 752 and the second stabilizer portion 754 may be pivotally coupled to one another at the central joint portion 778 through the lateral vehicle structure member 104. In embodiments, the central joint portion 778 may be positioned rearward of the first securement location 758 and the second securement location 760 in the vehicle longitudinal direction. It should be understood that the first stabilizer portion 752 and the second stabilizer portion 754 may be pivotally coupled by any suitable joining technique, including through pinning, or securing with an eyebolt, a rod end, or the like.

Referring again to FIG. 8, in embodiments, the lateral vehicle structure member 104 may be positioned between the first side support 112 and the second side support 114 in an engine bay 102 of the vehicle 100. The lateral vehicle structure member 104 may include various mechanical structural elements that are coupled to the unibody 110. In some embodiments, the lateral vehicle structure member 104 may include a cowl structure 106 that extends in the vehicle lateral direction across the unibody 110, and is coupled, directly or indirectly, to the first side support 112 and the second side support 114. In some embodiments, the lateral vehicle structure member 104 may include the dash panel that extends between the first side support 112 and the second side support 114. In some embodiments, the cowl structure 106 of the lateral vehicle structural member 104 may be positioned rearward of the dash panel in the vehicle longitudinal direction.

In embodiments in which the lateral vehicle structure member 104 includes a cowl structure 106, the central joint portion 778 may be coupled to the cowl structure 106. Because the cowl structure 106 may be coupled to the first side support 112 and the second side support 114, the central joint portion 778 may be coupled to the first and second side support 112, 114 through the cowl structure 106. The central joint portion 778 may be coupled to the lateral vehicle structure member 104 through a variety of joining techniques including, but not limited to, mechanical fasteners, spot welds, weld joints, structural adhesives, brazes, shear pins, and the like.

Figure 9:
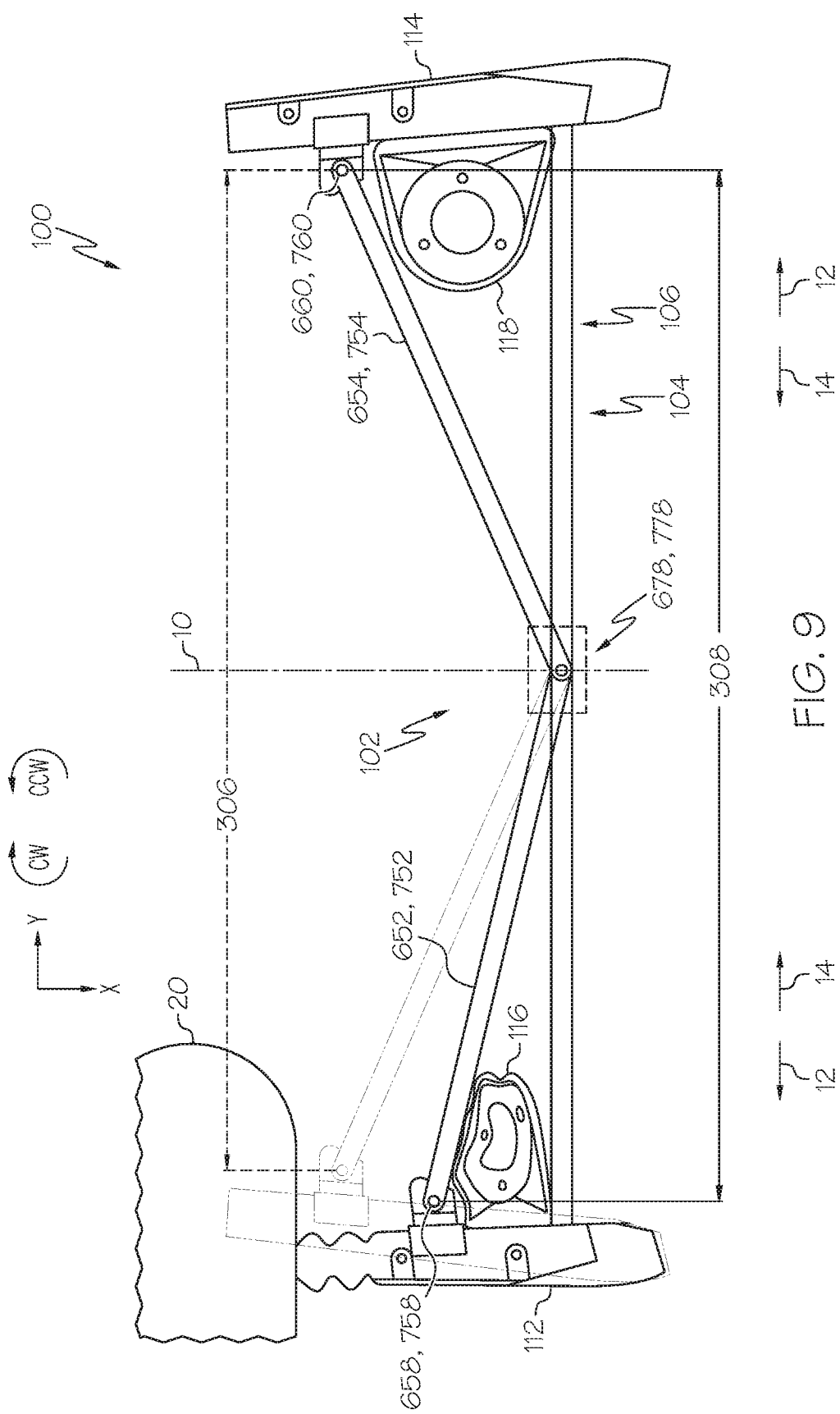
FIG. 9 schematically depicts a top view of a cross-vehicle stabilizing structure and a side support under deformation according to one or more embodiments shown or described herein.

The cross-vehicle stabilizer portion 650, 750 is repositionable between a deactivated position, as shown in FIGS. 6, 7, and 8, and an activated position, as shown in FIG. 9. The cross-vehicle stabilizer portion 650, 750 is nominally in the deactivated position during normal operation, as shown in FIGS. 6, 7, and 8. When the vehicle 100 strikes or is struck by a barrier 20, as shown in FIG. 9, the cross-vehicle stabilizer portion 650, 750 is repositioned into the activated position.

As described above, when the vehicle 100 strikes or is struck by a barrier 20, the structures of the vehicle plastically and elastically deform to absorb the energy of the impact. As described above, in a small front bumper overlap collision, energy from the impact may be directed into the first side support 112. While the vehicle 100 depicted in FIG. 9 shows a barrier 20 striking the front corner of the vehicle 100 proximate to the first side support 112, it should be understood that the vehicle 100 is symmetric about the vehicle centerline 10. Accordingly, the structures of the vehicle would perform similarly when a barrier strikes proximate to the second side support 114. More specifically, the second stabilizer portion 654, 754, second joint portion 734, and the second side support 114 would act similarly and in a symmetrical manner to the collision depicted in FIG. 9 when a barrier strikes the vehicle proximate to the second side support 114.

Because only a small portion of the front bumper (not depicted) of the vehicle 100 strikes the barrier 20 during a small front bumper overlap collision, energy absorbing structures associated with the front bumper may have a reduced effect on the dissipation of energy of the impact. Instead, the energy from the impact may be directed into the side support that is positioned proximate to the location of impact between the bumper and the barrier 20, for example the first side support 112, as depicted in FIG. 9. As the energy from the impact is directed into the first side support 112, the first side support 112 plastically and elastically deforms and translates in a generally rearward direction, absorbing energy from the impact.

As discussed hereinabove, the first side support 112 is coupled to the lateral vehicle structure member 104 through the first stabilizer portion 652, 752 and the central joint portion 678, 778. Similarly, the second side support 114 is coupled to the lateral vehicle structure member 104 through the second stabilizer portion 654, 754 and the central joint portion 678, 778. Because the first side support 112 is coupled to the lateral vehicle structure member 104 through the first stabilizer portion 652, 752 and the central joint portion 678, 778, the first stabilizer portion 652, 752 and the central joint portion 678, 778 may resist the inboard deflection of the first side support 112.

Referring to FIG. 9, as the first side support 112 deforms and translates rearward, the deformation and translation of the first side support 112 may cause the first stabilizer portion 652, 752 to rotate about the central joint portion 678, 778 in the counterclockwise direction. As the first stabilizer portion 652, 752 rotates about the central joint portion 678, 778, the cross-vehicle stabilizer portion 650, 750 is repositioned into the activated position, as depicted in FIG. 9. In the activated position, the cross-vehicle stabilizer portion 650, 750 has an effective length 308 that is evaluated between the first securement location 658, 758 and the second securement location 660, 760. Because the central joint portion 678, 778 is positioned rearward of the first securement location 658, 758 and the second securement location 660, 760 in the vehicle longitudinal direction, as the first stabilizer portion 652, 752 rotates about the central joint portion 678, 778, the distance between the first securement location 658, 758 and the second securement location 660, 760 increases. Accordingly, when the cross-vehicle stabilizer portion 650, 750 is in the activated position, the effective length 308 is greater than the effective length 306 of the cross-vehicle stabilizer portion 650, 750 in the deactivated position. Similarly, in embodiments that include a first joint portion 732 and a second joint portion 734, the effective length 308 evaluated between the first joint portion 732 and the second joint portion 734 is longer than the effective length 306 of the cross-vehicle stabilizer portion 750 in the deactivated position.

Because the first stabilizer portion 652 couples the first side support 112 to the lateral vehicle structure member 104 through the central joint portion 678, the cross-vehicle stabilizing structure 630, 730 may resist inboard deflection of the first side support 112. Because the first front suspension mount 116 is coupled to the first side support 112, the cross-vehicle stabilizing structure 630, 730 may resist inboard deflection of the first front suspension mount 116 and the front suspension unit 109 coupled to the first front suspension mount 116. Further, because the effective length 308 of the stabilizing structure is greater than the effective length 306 of the cross-vehicle stabilizing structure 630, 730, the cross-vehicle stabilizing structure 630, 730 resists inboard deflection of the first side support 112. By resisting the inboard deflection of the first side support 112, the cross-vehicle stabilizing structure 630, 730 assists in maintaining the first side support 112 and the first front suspension mount 116 near their original longitudinal orientation. As noted hereinabove, by maintaining the first side support 112 in its original longitudinal orientation, the first side support 112 may absorb more energy from the impact than when the first side support 112 deflects inboard and away from the impact. Further, when the first side support 112 is maintained close to its original longitudinal orientation, the first side support 112 may transfer more energy to the A-pillar 120 than when the first side support 112 deflects inboard and away from the impact. Additionally, when the first front suspension mount 116 and the front suspension unit 109 coupled to the first front suspension mount 116 is maintained near their original orientation, less energy associated with the collision may be transferred to the cabin 108 from the front suspension unit 109 as compared to collisions in which the front suspension unit 109 is not deflected inboard. Accordingly, by maintaining the first side support 112 near its original longitudinal orientation, the cross-vehicle stabilizing structure 630, 730 assists in distributing energy from the impact from the first side support 112 to the A-pillar 120.

Further, in embodiments that include a first joint portion 732 and a second joint portion 734, as discussed hereinabove, the first joint portion 732 includes a first stiffness-reducing portion 736 that may include a through hole 742 that extends through the first joint portion 732. In other embodiments, the first stiffness-reducing portion 736 may include a locally reduced thickness (not shown) that reduces the resistance to buckling of the respective first joint portion 732. As the first side support 112 deforms and translates rearward, the first joint portion 732 may also deform and translate rearward as energy from the impact is directed into the first side support 112. Because the first joint portion 732 deforms as energy from the impact is directed into the first side support 112, the first joint portion 732 may absorb energy from the impact.

The first stiffness-reducing portion 736 may be tuned, for example by selecting different sizes and/or shapes of the through hole 742 such that the first joint portion 732 selectively deforms, decreasing the stiffness of the first joint portion 732 and decreasing the energy absorption capacity of the first joint portion 732. In some embodiments, the reduced stiffness of the first joint portion 732 introduced by the first stiffness-reducing portion 736 may also strengthen the attachment between the first joint portion 732 and the underlying vehicle structure (the first side support 112 and/or the first front suspension mount 116) to which the first joint portion 732 is attached. By reducing the stiffness of the first joint portion 732, the first joint portion 732 may react in a similar manner to the introduction of energy associated with the impact as the underlying vehicle structure. Therefore, as the underlying vehicle structure elastically and plastically deforms, the first joint portion 732 similarly elastically and plastically deforms. By matching the deformation of the first joint portion 732 and the underlying vehicle structure, stress in the connection between the first joint portion 732 and the underlying vehicle structure may be minimized, such that the likelihood of separation of the first joint portion 732 from the underlying vehicle structure is minimized.

Additionally, as described hereinabove, the first joint portion 732 may be coupled to the first side support 112 at a first side support securement location 111, and the first joint portion 732 may be coupled to the first front suspension mount 116 at a first front suspension mount securement location 113. The first joint portion 732 may also be detached from the first side support 112 and the first front suspension mount 116 at a position between the first side support securement location 111 and the first front suspension mount securement location 113. Because the first joint portion 732 may be detached between the first side support securement location 111 and the first front suspension mount securement location 113, the first joint portion 132 may selectively deform between the first side support securement location 111 and the first front suspension mount securement location 113. Because the first joint portion 732 may selectively deform between the first side support securement location 111 and the first front suspension mount securement location 113, the first joint portion 732 may react in a similar manner to the introduction of energy associated with the impact as the underlying vehicle structure. By matching the deformation of the first joint portion 732 and the underlying vehicle structure, stress in the connection between the first joint portion 732 and the underlying vehicle structure may be minimized, such that the likelihood of separation of the first joint portion 732 from the underlying vehicle structure is minimized.

Further, as described hereinabove, the first joint portion 732 may be positioned such that at least a portion of the first joint portion 732 is positioned forward of the first front suspension mount 116 in the vehicle longitudinal direction. As also described hereinabove, the first joint portion 732 has a buckling strength evaluated in the vehicle longitudinal direction that is less than a buckling strength of the first front suspension mount 116 evaluated in the vehicle longitudinal direction. Because the first joint portion 732 may be positioned such that at least a portion of the first joint portion 732 is positioned forward of the first front suspension mount 116, of energy associated with the impact may be directed into the first joint portion 732 before being directed into the first front suspension mount 116. As the first joint portion 732 has a lower buckling strength than the first front suspension mount 116, the first joint portion 732 may elastically and plastically deform to absorb energy that would otherwise be directed into the first front suspension mount 116. Accordingly, the first joint portion 732 may reduce the energy that is directed into the first front suspension mount 116, which may subsequently be directed into the cabin 108 of the vehicle 100.

It should now be understood that vehicles according to the present disclosure may include a cross-vehicle stabilizing structure that extends across the engine bay of the vehicle and is coupled along opposite sides to vehicle structural members. The cross-vehicle stabilizing structure may increase the stiffness of the vehicle in the vehicle lateral direction, such that the side supports of the vehicle are maintained close to the vehicle longitudinal direction, thereby maintaining the energy absorption capacity of the side supports so that energy associated with the impact may be dissipated. According to various embodiments, the cross-vehicle stabilizing structures may include additional elements that allow for selective stiffening across the engine bay and increase the dynamic attachment interface between the cross-vehicle stabilizing structure and the vehicle structural members.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
 a first side support extending in a vehicle longitudinal direction;
 a second side support extending in the vehicle longitudinal direction and spaced apart from the first side support in a vehicle lateral direction that is transverse to the vehicle longitudinal direction;
 a first front suspension mount coupled to the first side support; and
 a cross-vehicle stabilizing structure extending between the first side support and the second side support, the cross-vehicle stabilizing structure comprising:
  a first joint portion coupled to the first side support, wherein the first joint portion has a buckling strength evaluated in the vehicle longitudinal direction that is less than a buckling strength of the first front suspension mount evaluated in the vehicle longitudinal direction;
  a second joint portion coupled to the second side support; and
  a cross-vehicle stabilizer portion coupled to the first joint portion and the second joint portion.

2. The vehicle of claim 1, wherein at least a portion of the first joint portion is positioned forward of the first front suspension mount in the vehicle longitudinal direction.

3. The vehicle of claim 2, wherein the first joint portion is coupled to the first side support at a first side support securement location and the first front suspension mount at a first front suspension mount securement location.

4. The vehicle of claim 3, wherein the first joint portion is detached from the first side support and the first front suspension mount at a position between the first side support securement location and the first front suspension mount securement location.

5. The vehicle of claim 1, wherein the first joint portion comprises a through hole that extends through the first joint portion.

6. The vehicle of claim 1, wherein the cross-vehicle stabilizer portion comprises a rigid body extending between the first joint portion and the second joint portion.

7. The vehicle of claim 1, wherein the cross-vehicle stabilizer portion comprises:
 a first stabilizer portion coupled to the first side support at a first securement location; and
 a second stabilizer portion coupled to the second side support at a second securement location, wherein the second stabilizer portion is pivotally coupled to the first stabilizer portion.

8. The vehicle of claim 7, wherein the cross-vehicle stabilizer portion further comprises a central stabilizer portion that is pivotally coupled to the first stabilizer portion and the second stabilizer portion, such that the first stabilizer portion is pivotally coupled to the second stabilizer portion through the central stabilizer portion.

9. The vehicle of claim 8, wherein the central stabilizer portion is positioned forward of the first securement location and the second securement location in the vehicle longitudinal direction.

10. The vehicle of claim 7, wherein the first stabilizer portion is pivotally coupled to the first side support and the second stabilizer portion is pivotally coupled to the second side support.

11. The vehicle of claim 7, wherein the first stabilizer portion and the second stabilizer portion are pivotally coupled to one another at a central joint portion.

12. The vehicle of claim 11, further comprising a lateral vehicle structure member positioned between the first side support and the second side support in the vehicle lateral direction, wherein the central joint portion is coupled to the lateral vehicle structure member and the and the first stabilizer portion and the second stabilizer portion are pivotally coupled to the central joint portion.

13. The vehicle of claim 11, wherein the central joint portion is positioned rearward of the first securement location and the second securement location in the vehicle longitudinal direction.

14. The vehicle of claim 1, wherein the cross-vehicle stabilizing structure is repositionable from a deactivated position to an activated position, the cross-vehicle stabilizer portion having an effective length that is evaluated from the first joint portion to the second joint portion that is longer in the activated position than in the deactivated position.

15. The vehicle of claim 14, wherein the cross-vehicle stabilizer portion comprises a first stabilizer portion pivotally coupled to the first side support at a first securement location and a second stabilizer portion pivotally coupled to the second side support at a second securement location, wherein the first stabilizer portion is pivotally coupled to the second stabilizer portion.

16. The vehicle of claim 15, wherein the cross-vehicle stabilizer portion further comprises a central stabilizer portion that is pivotally coupled to the first stabilizer portion and the second stabilizer portion, such that the first stabilizer portion is pivotally coupled to the second stabilizer portion through the central stabilizer portion.

17. The vehicle of claim 16, wherein when the cross-vehicle stabilizing structure is in the deactivated position, the central stabilizer portion is positioned forward of the first securement location and the second securement location in the vehicle longitudinal direction.

18. The vehicle of claim 16, wherein when the cross-vehicle stabilizing structure is in the activated position, one of the first stabilizer portion or the second stabilizer portion extends in a direction that is approximately parallel to the central stabilizer portion.

19. The vehicle of claim 15, wherein the cross-vehicle stabilizer portion further comprises a central joint portion, wherein the first stabilizer portion is pivotally coupled to the second stabilizer portion at the central joint portion.

* * * * *